(12) United States Patent
Amin-Shahidi et al.

(10) Patent No.: US 11,150,731 B2
(45) Date of Patent: Oct. 19, 2021

(54) MULTI-MODAL HAPTIC FEEDBACK FOR AN ELECTRONIC DEVICE USING A SINGLE HAPTIC ACTUATOR

(71) Applicant: Apple Inc., Cupertino, CA (US)

(72) Inventors: Darya Amin-Shahidi, San Jose, CA (US); Alex M. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/400,354

(22) Filed: May 1, 2019

(65) Prior Publication Data

US 2020/0103972 A1   Apr. 2, 2020

Related U.S. Application Data

(60) Provisional application No. 62/738,032, filed on Sep. 28, 2018.

(51) Int. Cl.
*G08B 6/00* (2006.01)
*G09B 21/00* (2006.01)
(Continued)

(52) U.S. Cl.
CPC .................................. *G06F 3/016* (2013.01)

(58) Field of Classification Search
CPC ...................................................... G06F 3/016
See application file for complete search history.

(56) References Cited

U.S. PATENT DOCUMENTS 5,979,242 A * 11/1999 Hobbs ...................... G01M 7/06
   73/663
6,057,753 A * 5/2000 Myers ...................... H02K 3/47
   340/407.1
(Continued)

FOREIGN PATENT DOCUMENTS

CN       2791708       6/2006
CN       107092306 A   8/2017
WO       2017/152139 A1 9/2017

OTHER PUBLICATIONS

Kruijff et al., Multilayer Haptic Feedback for Pen-Based Tablet Interaction (Year: 2019).*
(Continued)

*Primary Examiner* — Quang Pham
(74) *Attorney, Agent, or Firm* — Brownstein Hyatt Farber Schreck, LLP

(57) ABSTRACT

Systems, methods, and computer-readable media provide multiple modes of haptic feedback for an electronic device using a single haptic actuator. Adjusting a parameter (e.g., frequency) of an actuator waveform generated by the single haptic actuator may affect how a mechanical coupling between the haptic actuator and a portion of the electronic device produces a device waveform at that device portion from the actuator waveform. A first mechanical coupling with a first response characteristic (e.g., stiffness or resonance frequency) may be provided between the haptic actuator and a first portion of the electronic device (e.g., a user input component of the electronic device), while a second mechanical coupling with a different second response characteristic may be provided between the haptic actuator and a second portion of the electronic device (e.g., the device housing of the electronic device) to selectively provide localized haptic feedback at the first portion of the electronic device.

16 Claims, 15 Drawing Sheets

(51) Int. Cl.
*H04B 3/36* (2006.01)
*G06F 3/01* (2006.01)

(56) References Cited

U.S. PATENT DOCUMENTS

| | | | | |
|---|---|---|---|---|
| 6,088,019 A * | 7/2000 | Rosenberg | ............... | A63F 13/06 345/156 |
| 6,639,581 B1 * | 10/2003 | Moore | ................... | G05G 9/047 345/156 |
| 6,686,901 B2 * | 2/2004 | Rosenberg | ............... | A63F 13/06 345/156 |
| 6,693,622 B1 * | 2/2004 | Shahoian | ................ | G06F 3/016 345/156 |
| 6,704,001 B1 * | 3/2004 | Schena | .................. | G05G 9/047 310/12.04 |
| 7,061,466 B1 * | 6/2006 | Moore | ...................... | F16F 6/00 345/156 |
| 7,561,142 B2 * | 7/2009 | Shahoian | ................ | G06F 3/016 345/156 |
| 7,683,508 B2 * | 3/2010 | Delson | ................... | H01F 7/1615 310/21 |
| 8,259,066 B2 * | 9/2012 | Cheng | .................... | G06F 3/016 345/163 |
| 8,981,682 B2 * | 3/2015 | Delson | ................... | A63F 13/803 318/114 |
| 9,268,401 B2 * | 2/2016 | Provancher | ......... | G06F 3/04815 |
| 9,396,629 B1 * | 7/2016 | Weber | .................. | G06F 1/1684 |
| 9,591,221 B2 * | 3/2017 | Miller | .................... | G02B 7/023 |
| 9,619,031 B1 * | 4/2017 | Hajati | ...................... | G08B 6/00 |
| 9,681,053 B2 * | 6/2017 | Miller | ................ | H04N 5/23287 |
| 9,764,357 B2 * | 9/2017 | Houston | ................ | B06B 1/166 |
| 9,829,981 B1 * | 11/2017 | Ji | ................................ | G06F 3/016 |
| 9,830,782 B2 * | 11/2017 | Morrell | .............. | H04L 12/1895 |
| 9,880,626 B2 * | 1/2018 | Hajati | .................... | G06F 3/014 |
| 9,891,651 B2 * | 2/2018 | Jackson | .................... | G05G 5/03 |
| 10,156,649 B2 * | 12/2018 | Niemar | ................... | G01V 1/181 |
| 10,395,489 B1 * | 8/2019 | Cruz-Hernandez | ..... | G06F 3/016 |
| 10,453,315 B1 * | 10/2019 | Chen | ........................ | G08B 6/00 |
| 10,503,257 B2 * | 12/2019 | Masihy | ................ | G06F 1/1662 |
| 10,510,225 B2 * | 12/2019 | Khoshkava | ........... | G06F 1/1652 |
| 10,837,844 B2 * | 11/2020 | Chen | ..................... | G06F 3/016 |
| 10,936,071 B2 * | 3/2021 | Pandya | ................ | G06F 3/0346 |
| 11,029,787 B2 * | 6/2021 | de Castro | .......... | G06K 9/00154 |
| 2003/0080728 A1 * | 5/2003 | Daalmans | ................ | G01P 3/49 324/164 |
| 2004/0169425 A1 * | 9/2004 | Aihara | ................... | H02K 33/16 310/15 |
| 2008/0192002 A1 * | 8/2008 | Funch | ................... | G06F 3/03548 345/156 |
| 2009/0036212 A1 * | 2/2009 | Provancher | ............ | G06F 3/016 463/37 |
| 2009/0295552 A1 * | 12/2009 | Shahoian | ................ | G06F 3/016 340/407.1 |
| 2010/0090813 A1 * | 4/2010 | Je | ............................. | G06F 3/016 340/407.2 |
| 2010/0153845 A1 * | 6/2010 | Gregorio | ................ | G06F 3/041 715/702 |
| 2010/0213773 A1 * | 8/2010 | Dong | ..................... | H02K 33/16 310/25 |
| 2011/0032090 A1 * | 2/2011 | Provancher | ......... | G06F 3/03545 340/407.1 |
| 2011/0127880 A1 * | 6/2011 | Murphy | ................ | H01L 41/042 310/317 |
| 2011/0210926 A1 * | 9/2011 | Pasquero | ................ | G06F 1/1613 345/173 |
| 2011/0248916 A1 * | 10/2011 | Griffin | .................... | G06F 3/016 345/157 |
| 2011/0266892 A1 * | 11/2011 | Wauke | ................... | B06B 1/045 310/25 |
| 2012/0049660 A1 * | 3/2012 | Park | ....................... | B06B 1/045 310/25 |
| 2012/0169151 A1 * | 7/2012 | Dong | ..................... | H02K 33/16 310/25 |
| 2012/0256848 A1 * | 10/2012 | Madabusi Srinivasan | .................. | G06F 3/04883 345/173 |
| 2013/0002411 A1 * | 1/2013 | Henderson | ........... | H02N 2/0075 340/407.1 |
| 2013/0135794 A1 * | 5/2013 | Wang | .................... | H04M 1/026 361/679.01 |
| 2014/0085065 A1 * | 3/2014 | Biggs | .................... | G06F 3/03547 340/407.2 |
| 2014/0232646 A1 * | 8/2014 | Biggs | .................... | H01L 41/193 345/156 |
| 2014/0237834 A1 * | 8/2014 | Matsumiya | .............. | G01B 5/28 33/503 |
| 2014/0306576 A1 * | 10/2014 | Ervin | ....................... | F16F 7/00 310/323.01 |
| 2015/0130730 A1 * | 5/2015 | Harley | .................... | G06F 3/016 345/173 |
| 2015/0277562 A1 * | 10/2015 | Bard | ....................... | G06F 1/169 345/177 |
| 2015/0349619 A1 * | 12/2015 | Degner | ............. | H02K 41/0356 310/12.21 |
| 2016/0231815 A1 * | 8/2016 | Moussette | ............... | G06F 3/016 |
| 2016/0233012 A1 * | 8/2016 | Lubinski | ............... | H01F 41/02 |
| 2016/0241119 A1 * | 8/2016 | Keeler | ................... | H02K 33/00 |
| 2016/0258758 A1 * | 9/2016 | Houston | ................ | G01C 21/20 |
| 2016/0358724 A1 * | 12/2016 | Liao | ........................ | H01H 13/85 |
| 2016/0371942 A1 * | 12/2016 | Smith, IV | ............... | G06F 3/016 |
| 2017/0070131 A1 * | 3/2017 | Degner | ................... | H02K 35/00 |
| 2017/0084138 A1 * | 3/2017 | Hajati | ...................... | G08B 6/00 |
| 2017/0085165 A1 * | 3/2017 | Hajati | ...................... | G06F 3/02 |
| 2017/0089396 A1 * | 3/2017 | Lee | ........................ | F16C 33/04 |
| 2017/0090574 A1 | 3/2017 | Baer et al. | | |
| 2017/0229951 A1 * | 8/2017 | Zhang | .................... | H02K 33/18 |
| 2017/0243451 A1 * | 8/2017 | Alghooneh | ............. | G06F 1/163 |
| 2017/0255266 A1 * | 9/2017 | Holenarsipur | .......... | G06F 1/163 |
| 2017/0285747 A1 * | 10/2017 | Chen | ..................... | G06F 3/016 |
| 2017/0289694 A1 * | 10/2017 | Choi | ..................... | G06F 1/1647 |
| 2017/0293740 A1 | 10/2017 | Xing | | |
| 2017/0310245 A1 * | 10/2017 | Kojima | ............... | H02N 2/0055 |
| 2017/0315325 A1 * | 11/2017 | Oda | ........................ | H01L 41/09 |
| 2017/0315616 A1 * | 11/2017 | Kim | ......................... | G06F 3/016 |
| 2017/0329636 A1 * | 11/2017 | Azmoon | ................ | G06F 3/04845 |
| 2017/0357322 A1 * | 12/2017 | Son | ......................... | B06B 1/06 |
| 2018/0009003 A1 * | 1/2018 | Kim | ....................... | H01L 41/0533 |
| 2018/0018020 A1 * | 1/2018 | Grant | ..................... | G06F 3/016 |
| 2018/0028909 A1 * | 2/2018 | Kim | ....................... | A63F 13/285 |
| 2018/0041141 A1 * | 2/2018 | Shinzato | ............... | H02N 2/0085 |
| 2018/0061192 A1 * | 3/2018 | Chen | ..................... | H04R 19/04 |
| 2018/0107378 A1 * | 4/2018 | Rosenberg | ............. | G06F 3/016 |
| 2018/0175274 A1 * | 6/2018 | Noh | ......................... | H01L 41/094 |
| 2018/0190086 A1 * | 7/2018 | Alghooneh | ........... | G06F 1/1637 |
| 2018/0204426 A1 * | 7/2018 | Nagisetty | ............... | G06F 3/016 |
| 2018/0211751 A1 * | 7/2018 | Khoshkava | ............. | H01F 7/14 |
| 2018/0218859 A1 * | 8/2018 | Ligtenberg | ............. | G06F 3/0416 |
| 2018/0226560 A1 * | 8/2018 | Yonemura | .............. | B41J 2/1628 |
| 2018/0294747 A1 * | 10/2018 | Arakawa | ................ | G03B 21/142 |
| 2019/0001827 A1 * | 1/2019 | Perez Vallejo | ........ | B60L 53/126 |
| 2019/0027674 A1 * | 1/2019 | Zhang | .................... | H01L 41/0825 |
| 2019/0039092 A1 * | 2/2019 | Kim | ........................ | B06B 1/045 |
| 2019/0041986 A1 * | 2/2019 | Rihn | ..................... | A63F 13/285 |
| 2019/0087002 A1 * | 3/2019 | Mani | ..................... | G09B 21/003 |
| 2019/0087063 A1 * | 3/2019 | Gomi | ................... | H02K 35/04 |
| 2019/0187814 A1 * | 6/2019 | Budiman | .............. | G06F 3/0362 |
| 2019/0363622 A1 * | 11/2019 | Kim | ........................... | G06F 3/01 |
| 2019/0384396 A1 * | 12/2019 | Cruz Hernandez | ..... | G06F 3/016 |
| 2019/0384399 A1 * | 12/2019 | Forest | ..................... | B06B 1/18 |
| 2020/0059544 A1 * | 2/2020 | Hwang | ................... | H04R 17/00 |
| 2020/0127547 A1 * | 4/2020 | Takahashi | ............. | H04M 19/04 |

OTHER PUBLICATIONS

Echeverry-Velásquez et al., Design, construction, and evaluation of an energy harvesting prototype built with piezoelectric materials (Year: 2019).*

Larkin, Article A Review On Vibrating Beam-based micronano-gyroscopes (Year: 2021).*

(56) References Cited

OTHER PUBLICATIONS

Pezent et al., Tasbi Multisensory Squeeze and Vibrotactile Wrist Haptics for Augmented and Virtual Reality (Year: 2019).*
Waghulde et al., Vibration Control of Cantilever Smart Beam by using Piezoelectric Actuators and Sensors (Year: 2010).*
Zubrycki-Granosik, Article Novel Haptic Device Using Jamming Principle for Providing Kinaesthetic Feedback in Glove-Based Control Interface (Year: 2017).*
Frediani et al., Wearable Wireless Tactile Display for Virtual Interactions with Soft Bodies (Year: 2014).*
Kwon et al., Trend & prospects of haptic technology in mobile devices (Year: 2010).*
Maiero et al., Back-of-Device Force Feedback Improves Touchscreen Interaction for Mobile Devices (Year: 2020).*
Pacchierotti et al., Wearable Haptic Systems for the Fingertip and the Hand Taxonomy Review and Perspectives (Year: 2017).*
Pasquero et al., Haptically Enabled Handheld Information Display With Distributed Tactile Transducer (Year: 2007).*

* cited by examiner

MULTI-MODAL HAPTIC FEEDBACK FOR AN ELECTRONIC DEVICE USING A SINGLE HAPTIC ACTUATOR

CROSS-REFERENCE(S)

This application claims the benefit of prior filed U.S. Provisional Patent Application No. 62/738,032, filed Sep. 28, 2018, which is hereby incorporated by reference herein in its entirety.

FIELD

This generally relates to providing multiple modes of haptic feedback, and, more particularly, to providing multiple modes of haptic feedback for an electronic device using a single haptic actuator.

BACKGROUND

Haptic technology, which may simply be referred to as haptics, is a tactile feedback-based technology that may stimulate a user's sense of touch by imparting relative amounts of force to the user. Haptics has become a popular way of conveying information to users of consumer electronic devices. For example, an electronic device may include a haptic actuator that provides tactile feedback to the user when the user is in contact with any part of the electronic device, where the haptic actuator may apply relative amounts of force to a user of the electronic device through actuation of a mass that is part of the haptic actuator.

SUMMARY

Systems, methods, and computer-readable media for enabling multiple modes of haptic feedback for an electronic device using a single haptic actuator are provided.

For example, an electronic device may be provided that includes a device housing defining an interior space, a haptic actuator positioned within the interior space, an input component positioned at least partially within the interior space and accessible by a user via an opening extending through the device housing, a haptic-housing coupling mechanism physically coupling the haptic actuator to the device housing, and a haptic-input coupling mechanism physically coupling the haptic actuator to the input component, wherein a compliance of the haptic-input coupling mechanism is less than a compliance of the haptic-housing coupling mechanism.

As another example, a haptic feedback assembly for an electronic device including a first component and a second component may be provided that includes a haptic actuator, a first coupling mechanism operative to physically couple the haptic actuator to the first component, and a second coupling mechanism operative to physically couple the haptic actuator to the second component, wherein a compliance of the second coupling mechanism is less than a compliance of the first coupling mechanism.

As another example, an electronic device may be provided that includes a device housing defining an interior space, a haptic actuator positioned within the interior space, an input component, a haptic-housing coupling mechanism softly mounting the haptic actuator to the device housing, and a haptic-input coupling mechanism physically coupling the haptic actuator to the input component while enabling the input component to move freely in at least one direction with respect to the device housing.

As yet another example, an electronic device may be provided that includes a device housing defining an interior space, a haptic actuator positioned within the interior space, and a haptic-housing coupling mechanism physically coupling the haptic actuator to the device housing, wherein the haptic actuator includes a first fundamental resonance frequency, and the haptic-housing coupling mechanism includes a second fundamental resonance frequency that is greater than the first fundamental resonance frequency.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which.

DETAILED DESCRIPTION

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

The present disclosure relates to enabling multiple modes of haptic feedback for an electronic device using a single haptic actuator. Adjusting a parameter (e.g., frequency) of an actuator waveform generated by the single haptic actuator may affect how a mechanical coupling (e.g., a compliant coupling) between the haptic actuator and a portion of the electronic device produces, from the actuator waveform, a device waveform at that device portion. A first (e.g., more rigid (e.g., less compliant)) mechanical coupling (e.g., a welding joint) may be provided between the haptic actuator and a first portion of the electronic device (e.g., a user input component of the electronic device), while a second (e.g., less rigid (e.g., more compliant)) mechanical coupling (e.g., via a spring or cushion) may be provided between the haptic actuator and a second portion of the electronic device (e.g., the device housing of the electronic device) in order to selectively provide localized haptic feedback at the first portion of the electronic device (e.g., by adjusting a parameter (e.g., frequency parameter) of the actuator waveform), where the first and second portions of the electronic device may not be physically coupled to one another or may be significantly compliantly coupled to one another as compared to any compliancy of each device portion's respective coupling to the actuator housing.

Systems, methods, and computer-readable media for enabling multiple modes of haptic feedback for an electronic device using a single haptic actuator are provided and described with reference to FIGS. 1-16.

Figure 1:
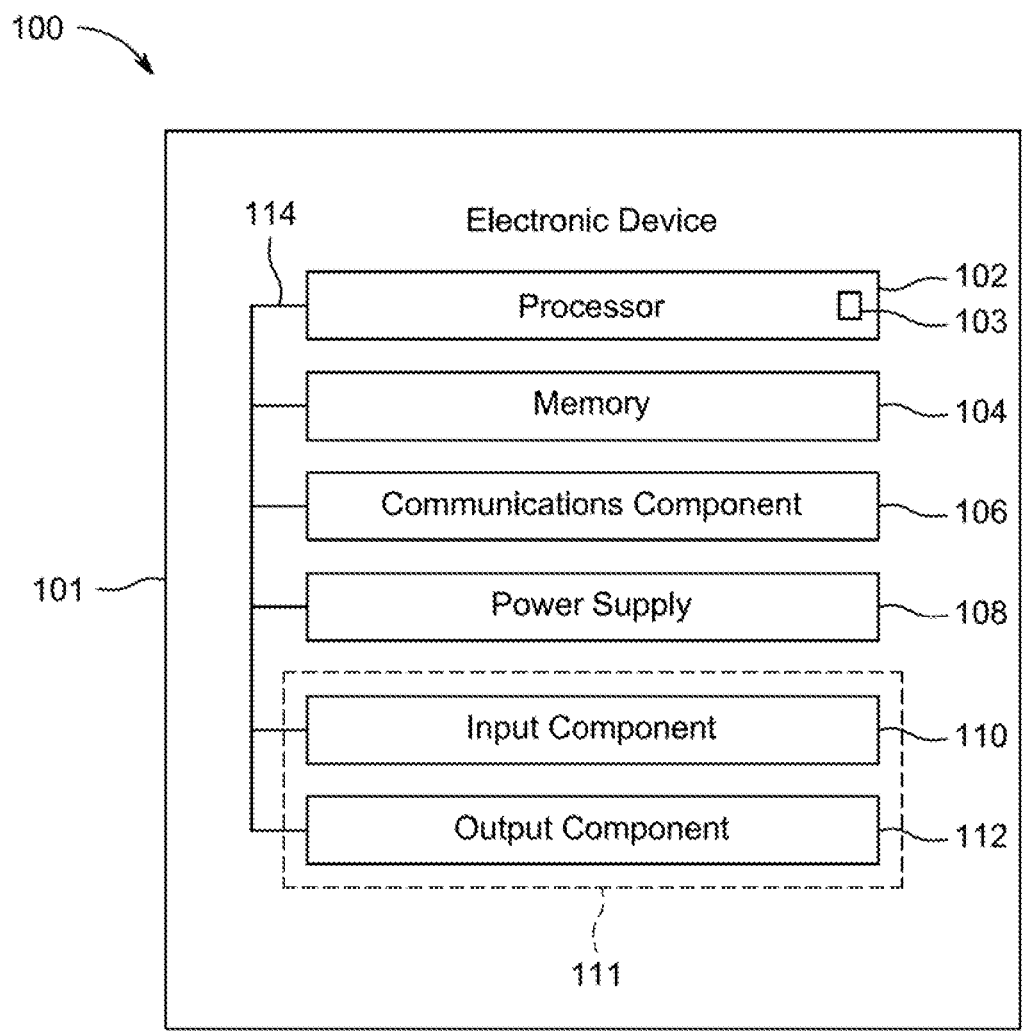
FIG. 1 is a schematic view of an illustrative electronic device enabled for multiple modes of haptic feedback.

FIG. 1 is a schematic view of an illustrative electronic device 100 that may provide multiple modes of haptic feedback. Electronic device 100 may be any portable, mobile, or hand-held electronic device configured to provide multiple modes of haptic feedback. Alternatively, electronic device 100 may not be portable at all, but may instead be generally stationary. Electronic device 100 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, wearable device (e.g., an Apple Watch™ by Apple Inc. to be worn on a wrist, a head-wearable device, etc.), boom box, modem, router, printer, and combinations thereof. Electronic device 100 may include any suitable controller or control circuitry or processor 102, memory 104, communications component 106, power supply 108, input component 110, and output component 112. Electronic device 100 may also include a bus 114 that may provide one or more wired or wireless communication links or paths for transferring data and/or power to, from, or between various other components of device 100. Device 100 may also be provided with a device housing 101 that may at least partially enclose one or more of the components of device 100 for protection from debris and other degrading forces external to device 100. Device housing 101 may provide at least a portion of the cosmetic exterior of device 100 and may be made of any suitable material(s), including, but not limited to, glass, ceramic, metal, plastic, wood, and/or the like. In some embodiments, one or more of the components may be provided within its own device housing (e.g., input component 110 may be an independent keyboard or mouse within its own device housing that may wirelessly or through a wire communicate with processor 102, which may be provided within its own device housing). In some embodiments, one or more components of electronic device 100 may be combined or omitted. Moreover, electronic device 100 may include other components not combined or included in FIG. 1. For example, device 100 may include any other suitable components or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., applications for implementing functions on device 100 (e.g., haptic synthesizer applications that may be configured to be used by a synthesizer engine generate and/or provide instructions or voltage waveforms for recreating a haptic atom or sequence of atoms, along with any effectors, to a haptic actuator, etc.)), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection with any other suitable device or server or other remote entity), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems using any suitable communications protocol(s). For example, communications component 106 may support Wi-Fi (e.g., an 802.11 protocol), Ethernet, Bluetooth™, near field communication ("NFC"), radio-frequency identification ("RFID"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications component 106 may also include circuitry that can enable device 100 to be electrically coupled to another device or server or subsystem and communicate with that other device, either wirelessly or via a wired connection.

Power supply 108 may provide power to one or more of the components of device 100. In some embodiments, power supply 108 can include one or more batteries for providing power (e.g., when device 100 is a portable device, such as a cellular telephone). In some embodiments, power supply 108 can be coupled to a power grid (e.g., for charging a portable battery and/or when device 100 is not a portable device, such as a desktop computer). As another example, power supply 108 can be configured to generate power from a natural source (e.g., solar power using solar cells).

One or more input components 110 may be provided to permit a user to interact or interface with device 100 and/or to sense certain information about the ambient environment. For example, input component 110 can take a variety of forms, including, but not limited to, a touch pad, trackpad, dial, click wheel, scroll wheel, touch screen, one or more buttons, a keyboard, push-button switch, rotary dial, mouse, joy stick, track ball, switch, photocell, force-sensing resistor ("FSR"), encoder (e.g., rotary encoder and/or shaft encoder that may convert an angular position or motion of a shaft or axle to an analog or digital code), microphone, camera, scanner (e.g., a barcode scanner or any other suitable scanner that may obtain product identifying information from a code, such as a linear barcode, a matrix barcode (e.g., a quick response ("QR") code), or the like), proximity sensor (e.g., capacitive proximity sensor), biometric sensor (e.g., a fingerprint reader or other feature recognition sensor, which may operate in conjunction with a feature-processing application that may be accessible to electronic device 100 for authenticating or otherwise identifying or detecting a user), line-in connector for data and/or power, force sensor (e.g., any suitable capacitive sensors, pressure sensors, strain gauges, sensing plates (e.g., capacitive and/or strain sensing plates), etc.), temperature sensor (e.g., thermistor, thermocouple, thermometer, silicon bandgap temperature sensor, bimetal sensor, etc.) for detecting the temperature of a portion of electronic device 100 or an ambient environment thereof, a performance analyzer for detecting an application characteristic related to the current operation of one or more components of electronic device 100 (e.g., processor 102), motion sensor (e.g., single-axis or multi-axis accelerometers, angular rate or inertial sensors (e.g., optical gyroscopes, vibrating gyroscopes, gas rate gyroscopes, or ring gyroscopes), linear velocity sensors, and/or the like), magnetometer (e.g., scalar or vector magnetometer), pressure sensor, light sensor (e.g., ambient light sensor ("ALS"), infrared ("IR") sensor, etc.), thermal sensor, acoustic sensor, sonic or sonar sensor, radar sensor, image sensor, video sensor, global positioning system ("GPS") detector, radio frequency ("RF") detector, RF or acoustic Doppler detector, RF triangulation detector, electrical charge sensor, peripheral device detector, event counter, and any combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. An output component of electronic device 100 may take various forms, including, but not limited to, audio speakers, headphones, data and/or power line-outs, visual displays (e.g., for transmitting data via visible light and/or via invisible light), antennas, infrared ports, flashes (e.g., light sources for providing artificial light for illuminating an environment of the device), tactile/haptic/taptic outputs (e.g., rumblers, vibrators, haptic actuators, any suitable components that are operative to provide tactile sensations in the form of vibrations and/or the like, etc.), and any combinations thereof.

It should be noted that one or more input components 110 and one or more output components 112 may sometimes be referred to collectively herein as an input/output ("I/O") component or I/O interface 111. For example, a touch sensor type of input component 110 and display type of output component 112 may sometimes be a single I/O component 111, such as a touch screen, that may receive input information through a user's touch of a display screen and that may also provide visual information to a user via that same display screen.

Processor 102 of device 100 may include any processing circuitry operative to control the operations and performance of one or more components of electronic device 100. For example, processor 102 may be used to run one or more applications, such as an application 103. Application 103 may include, but is not limited to, one or more operating system applications, firmware applications, and/or software applications, such as haptic synthesizer applications that may be configured to be used by a synthesizer engine or any suitable module to generate and/or provide instructions or voltage waveforms for recreating a haptic atom or sequence of atoms, along with any effectors, for use by a haptic output component (e.g., a haptic actuator), media playback applications, media editing applications, pass applications, calendar applications, state determination applications (e.g., device state determination applications), biometric feature-processing applications, compass applications, health applications, thermometer applications, weather applications, thermal management applications, force sensing applications, device diagnostic applications, video game applications, or any other suitable applications. For example, processor 102 may load application 103 as a user interface program or any other suitable program to determine how instructions or data received via any suitable one or more input components 110 (e.g., due to user interaction with a mechanical button and/or motion sensor, etc.) and/or any other component of device 100 (e.g., application data indicative of any suitable event (e.g., a calendar event) and/or remote data that may be received via communications component 106, etc.) may manipulate the one or more ways in which information may be stored on device 100 (e.g., in memory 104) and/or provided to a user via an output component 112 (e.g., via a haptic actuator output component) and/or communicated to a remote subsystem (e.g., to any other electronic device or remote server or the like via communications component 106). Application 103 may be accessed by processor 102 from any suitable source, such as from memory 104 (e.g., via bus 114) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes. Processor 102 may be implemented as any electronic device capable of processing, receiving, or transmitting data or instructions. For example, process 102 can be a microprocessor, a central processing unit, an application-specific integrated circuit, a field-programmable gate array, a digital signal processor, an analog circuit, a digital circuit, or combination of such devices. Processor 102 may be a single-thread or multi-thread processor. Processor 102 may be a single-core or multi-core processor. Accordingly, as described herein, the term "processor" may refer to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements. Processor or processing unit or controller 102 may be configured to access memory 104, which may have various instructions, computer programs or other data stored thereon. The instructions or computer programs may be configured to perform one or more of the operations or functions described with respect to the electronic device 100. For example, the instructions may be configured to control or coordinate the operation of one or more input components 110, one or more output components 112, one or more communications components 106, one or more power supplies 108, and/or any other suitable component(s) of device 100.

Figure 2:
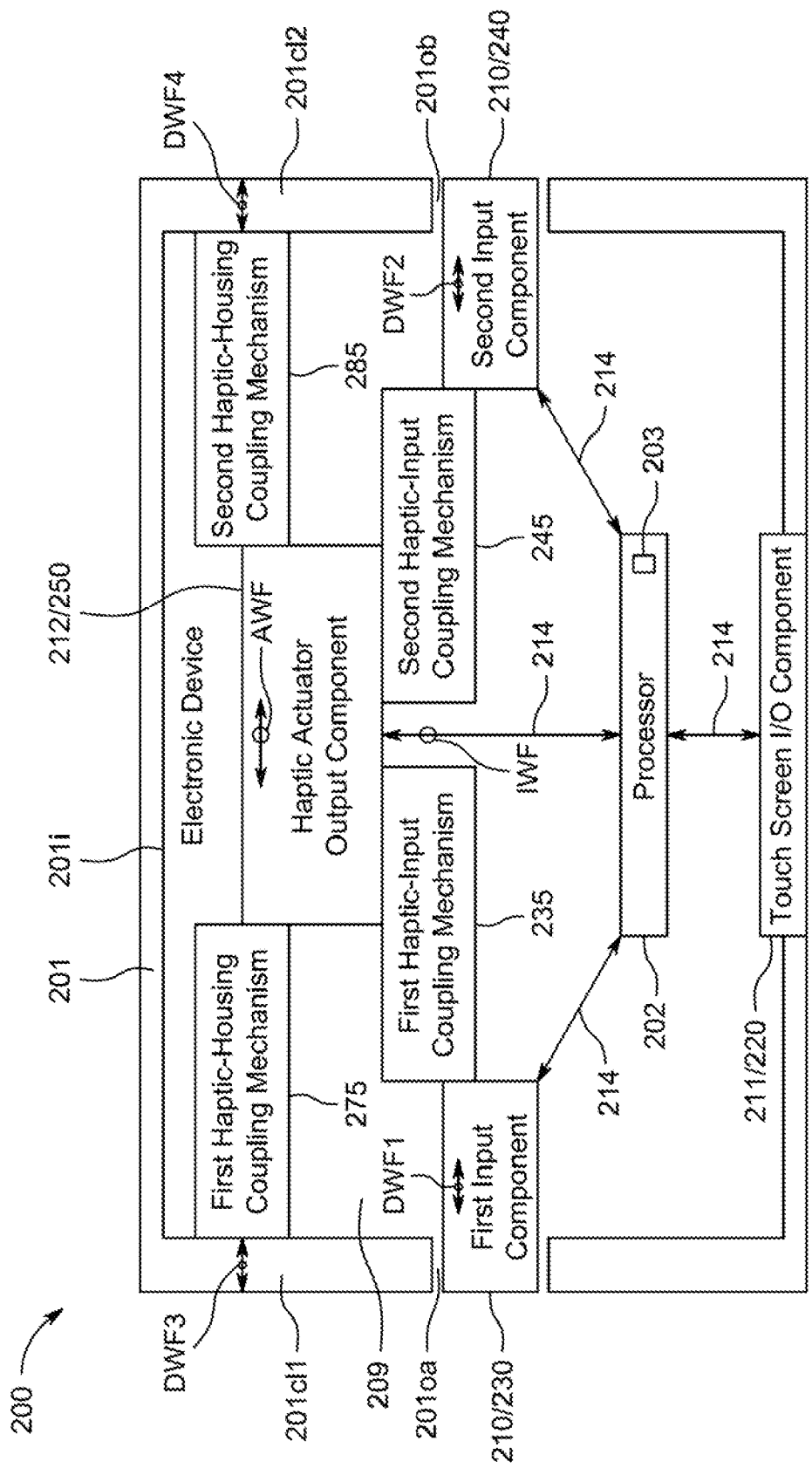
FIG. 2 is a schematic view of another illustrative electronic device enabled for multiple modes of haptic feedback.
Figure 3:
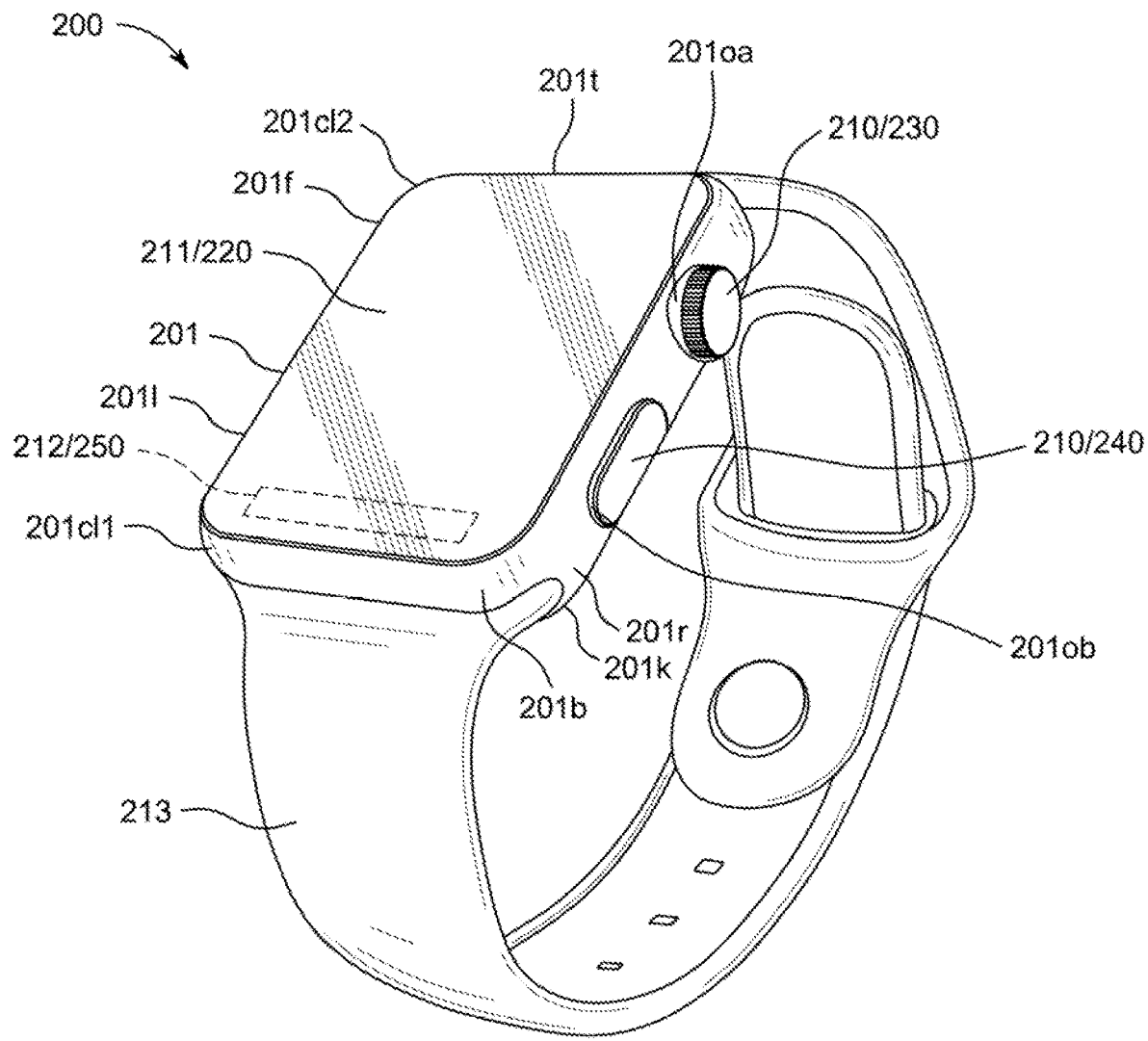
FIG. 3 is a front, right, bottom perspective view of the electronic device of FIG. 2.

As shown in FIGS. 2-11, for example, an electronic device 200 may be operative to provide multiple modes of haptic feedback, where device 200 may be configured as an electronic device (e.g., a wearable electronic device) with an I/O component (e.g., a touch screen I/O component), two different input components, and a haptic actuator output component, each of which may be at least partially provided within a device housing (e.g., a housing that may be worn by a user (e.g., on a user's wrist as a smart watch)). Device 200 may include any suitable control circuitry or processor 202, which may be similar to any suitable processor 102 of device 100, application 203, which may be similar to any suitable application 103 of device 100, memory (not shown), which may be similar to any suitable memory 104 of device 100, communications component (not shown), which may be similar to any suitable communications component 106 of device 100, power supply (not shown), which may be similar to any suitable power supply 108 of device 100, at least one input component 210, which may be similar to any suitable input component 110 of device 100 (e.g., one input component 210 as a first input component 230 and another input component 210 as a second input component 240), at least one output component 212, which may be similar to any suitable input component 110 of device 100 (e.g., output component 212 as a haptic actuator output component 250), I/O component 211, which may be similar to any suitable I/O component 111 of device 100 (e.g., I/O component 211 as a touch screen I/O component 220), one or more busses 214, which may be similar to any suitable bus 114 of device 100, and/or housing 201, which may be similar to any suitable housing 101 of device 100. Housing 201 may be any suitable shape and may include any suitable number of walls, which may define an internal housing space 209 within which one or more other device components may be at least partially positioned. In some embodiments, as shown in FIG. 3, for example, housing 201 may be of a generally hexahedral shape and may include a top wall 201t, a bottom wall 201b that may be opposite top wall 201t, a left wall 201l, a right wall 201r that may be opposite left wall 201l, a front wall 201f, and a back wall 201k that may be opposite front wall 201f, where at least a portion of I/O component 211 may be at least partially exposed to the external environment via a housing opening through front wall 201f, where at least a portion of input component 230 may be at least partially exposed to the external environment via a housing opening 201oa through right wall 201r, and where at least a portion of input component 240 may be at least partially exposed to the external environment via a housing opening 201ob through right wall 201r (or via a housing opening through left wall 201l or the like). In some embodiments, one or more components of device 200 may be combined or omitted. Moreover, device 200 may include other components not combined or included in FIGS. 2-11. For example, device 200 may include any other suitable components or several instances of the components shown in FIG. 1 or only some but not all of the components shown in FIGS. 2-11. For the sake of simplicity, only one of each of the components is shown in FIGS. 2-11. While device 200 may illustratively be a smart watch (e.g., a wearable mobile wireless communications device (e.g., an Apple Watch™)) that may include a band or strap 213 for securing housing 201 to a user, it is to be understood that device 200 may be any other type of electronic device, for example, a cellular telephone, a tablet computer, a laptop computer, any suitable wearable device, and/or the like (e.g., as described with respect to device 100). In some embodiments, each one of first and second input components 230 and 240 may be configured to be finger-operated user input devices, such as may be illustratively in the form of a rotary dial input component 230 (e.g., a digital crown) and a pushbutton switch input component 240, which may be communicatively coupled to processor 202 via one or more busses 214. Each input component may cooperate with processor 202 to perform one or more device functions in response to operation thereof. For example, a device function may include a powering on or off of electronic device 200, initiating communication via a wireless communications component of device 200, and/or performing a menu function of a user interface application that may be running on device 200. Haptic actuator output component 250 may be communicatively coupled to processor 202 via one or more busses 214 and may be operative to provide haptic feedback to the user (e.g., in the form of various vibrations or "taps" (e.g., particularly when the user is wearing device 200)). As just one example, provided haptic feedback may be indicative of a message received, and the duration of the feedback may be indicative of the type of message received. Of course, the haptic feedback may be indicative of or convey any other suitable types of information. Processor 202 may be configured to apply a voltage or any other suitable signal(s) to move a moveable body or masses between first and second positions along one or more axes. For example, processor 202 or any other component(s) of the device may provide or include a class-D amplifier to drive haptic actuator output component 250 and/or sensors for sensing voltage and/or current (see, e.g., FIG. 13).

Figure 4:
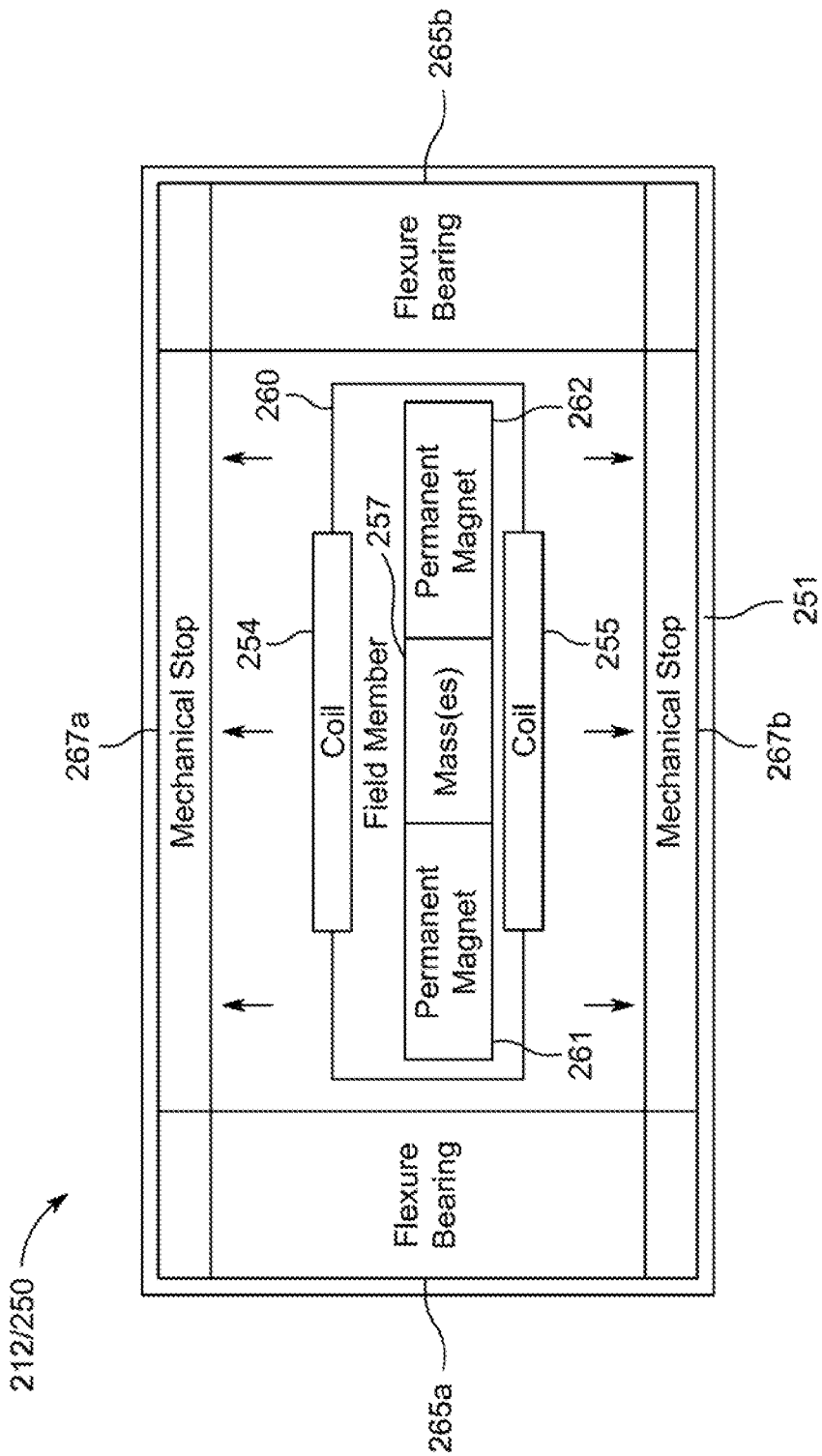
FIG. 4 is a schematic view of a portion of the electronic device of FIGS. 2 and 3.

As shown in FIG. 4, for example, haptic actuator 250 may include an actuator housing 251, which may illustratively have a dimension in a length direction greater than a dimension in a width direction. Actuator housing 251 (e.g., a stator) may be provided by any suitable material(s) and may be provided by any suitable structure(s) (e.g., ferritic structure(s) for supporting the ability of haptic actuator 250 to generate haptic feedback). Haptic actuator 250 may include one or more coils, such as first and second coils 254 and 255, which may be carried by actuator housing 251, for example, by the top and the bottom of housing 251, respectively. The first and second coils 254 and 255 may each have a loop shape or "racetrack" shape and may be aligned in a stacked relation and spaced apart. Haptic actuator 250 may also include a field member 260 that may be carried by actuator housing 251. Field member 260, similarly to actuator housing 250, may have a dimension in a length direction greater than a dimension in a width direction. Thus, field member 260 may be reciprocally movable in the width direction (e.g., the y-direction). While the movement of field member 260 may be described as being moveable in one direction (e.g., a linear haptic actuator), it should be understood that in some embodiments, the field member may be movable in other directions (e.g., an angular haptic actuator), or may be a combination of both a linear and an angular haptic actuator.

Field member 260 may include one or more magnets (e.g., permanent magnets). For example, as shown, field member 260 may illustratively include permanent magnets 261 and 262 between first and second coils 254 and 255. Magnets 261 and 262 may be neodymium or any other suitable material, for example, and may be positioned in opposing directions with respect to their respective poles. Magnets 261 and 262 may have a rectangular shape and may be aligned along a length of first and second coils 254 and 255. While a pair of rectangular shaped permanent magnets may be illustrated, it will be appreciated that there may be any number of permanent magnets having any shape between first and second coils 254 and 255. Field member 260 may also include a mass 257 between magnets 261 and 262. Mass 257 may be tungsten or any suitable different material(s) and may be more than one mass. Haptic actuator 250 may also include respective mass flexures or flexure bearings 265*a* and 265*b* that may mount first and second sides of field member 260 to be reciprocally movable within actuator housing 251 responsive to first and second coils 254 and 255. For example, flexure bearings 265*a* and 265*b* may be operative to mount respective sides of field member 260 to be reciprocally movable within actuator housing 251 responsive to coils 254 and 255. More particularly, flexure bearings 265*a* and 265*b* may move or flex in the direction of field member 260 and return it to an equilibrium position. As just one example, overall flexure or movement of each one of flexure bearings 265*a* and 265*b* may be about $\frac{1}{10}^{th}$ of the length of the flexure bearing. For example, flexure bearings 265*a* and 265*b* may be operative to provide a suspension system that may include one or more springs for maintaining field member 260 suspended in housing 251. The springs may include mechanical springs, such as, for example, coil springs, leaf springs, and flexures. The springs may also or additionally include magnetic springs that, through interaction with the permanent magnets and/or ferritic parts of housing 251, if any, may store and amplify the energy in the form of elastic/magnetic energy. In addition, the suspension system, for example, through shafts, linear/angular bearings, sliding bearings, flexures, multi-bar linkage mechanisms, and springs, may enable motion of the field member 260 in the desired direction (e.g., along an axis in a linear actuator or around a certain axis in an angular actuator) while constraining motion in other degrees of freedom. The suspension system may include other and/or additional components for maintaining the suspension of the field member 260 as well as constrain movement of the field member. Haptic actuator 250 may also include mechanical limit stops 267*a* and 267*b* between housing 251 and field member 260, where mechanical limit stops 267*a* and 267*b* may be operative to limit the movement of field member 260 to a desired range and/or to stop field member 260 from crashing or banging into housing 251. While mechanical stops 267*a* and 267*b* are described, it will be appreciated that the mechanical stops may be part of or a portion of housing 251. In other embodiments (not shown), the haptic actuator may include a permanent magnet carried by the actuator housing, and the field member may include one or more coils that cooperate with the permanent magnet. In other words, in contrast to the embodiment described above with respect to FIG. 4, the permanent magnet may be stationary (e.g., carried by the actuator housing) and the coils, as part of the field member, may be moving (e.g., connected to the mass). Of course, there may be any number of coils and/or permanent magnets.

Generally, haptic outputs may be used to notify, alert or otherwise gain the attention of a person or a user. For example, haptic actuator 250 of wearable device 200 may be operative to move or shake device 200, such that the person wearing device 200 has his or her attention drawn to it. Example electronic devices may be physically coupled to a haptic actuator that is operative to produce a haptic/tactile output. Generally, a haptic actuator may produce relative motion between two parts of the electronic device. More specifically, haptic actuator 250 may include internal mass (es) 257 that may be operative to move with respect to a mass of electronic device 200. For example, haptic actuator 250 may be operative to react to an actuator input waveform IWF (e.g., as may be provided by processor 202 (e.g., via one or more busses 214) (e.g., as shown in FIG. 2)) to create forces that may move the internal mass relative to the electronic device. These forces may impart kinetic energy to the electronic device, thereby inducing motion in the device. This device motion may be represented by a device output waveform. This device motion may be felt by a person wearing, holding, or interacting with the device.

The terms "haptic" and "tactile" are used herein. It should be understood that, although haptic may sometimes refer to a sense or perception of force and tactile may sometimes refer to a sense or perception of touch, the two terms may be used herein in a substantially interchangeable manner and each term is intended to encompass the other. Thus, a haptic output may encompass a tactile output and a tactile output may encompass a haptic output. Certain embodiments may employ unique and distinct haptic waveforms (e.g., "atoms") to provide haptic alerts to a user. More specifically, an atom may correspond to a drive signal that may include a voltage, a voltage value, a current, or any other suitable electrical input that may be configured to control an actuator. In some embodiments, once the atom has been played by the actuator, the actuator may return to its nominal position. These atoms may be combined in a variety of forms and ways to create different haptic patterns. The atoms may be thought of as letters of a haptic language. Each atom may represent a base building block or a base haptic pattern or waveform of the haptic language. Accordingly, the combination of different atoms results in different words and/or phrases in the haptic language. As the various atoms are combined in different patterns, the alerts of the haptic language may become more advanced. As a result, different "words" or "phrases" of the haptic language may be associated with, for example, various alert events or notifications. The various atoms may be chosen from a predefined or prearranged library of atoms. The atoms in the library may also be freely combined with one another. In some implementations, different combinations of atoms may be cycled or otherwise repeated at a given frequency or over a certain duration of time. For example, a first atom or combination of atoms may be played 10 times at certain intervals. This cycle may then be repeated for a specified number of times and/or for specified duration. As a user of the electronic device becomes familiar with the haptic language, the user may be able to understand what event notifications or alerts are being received based, for example, solely or in part on the haptic output provided by the haptic language. Further, a user (or developer) may be able to program or create a customized haptic language specific or otherwise tailored to the needs of the user, a program, an application and the like. Audio and/or acoustic output may also be provided as part of, or in addition to, a haptic waveform of an alert. Addition of the audio output may further enhance the haptic language and/or enable further customization of alerts. Accordingly, alerts may be generated for any suitable purpose, including, but not limited to, upon receipt of data by the electronic device from an external source (e.g., text messages, emails, phone calls, warning systems, and the like), by an application (e.g., to indicate that a user input is requested), by an input component (e.g., when a suitable user input is detected by any input component of the device), upon reaching a certain time (e.g., a time at which a calendar entry occurs), by an operational state of the electronic device (e.g., a low battery charge, an upgrade to the operating system of the electronic device, the temperature of the electronic device reaching a certain point and so on), through a user-initiated setting (e.g., an alarm set to occur at a certain time), due to geographic factors (e.g., entering or exiting a certain area), proximity to another person and/or another electronic device, and/or the like. Basic atoms may correspond to simple alerts while more complex combinations of atoms may correspond to more intricate alerts. Various alerts may be provided for a variety of operations of an electronic device, information received by an electronic device, information displayed by an electronic device, interactions with a graphical user interface of an electronic device, acknowledgement of user inputs, and so on, collectively referred to as "alert events" or "alert conditions". Moreover, different haptic alerts may be provided by different portions of electronic device 200 for enabling device 200 to provide multi-modal haptic feedback. For example, a majority of a first haptic alert may be provided generally by housing 201 of device 200 (e.g., as may be felt generally by a user's wrist when wearing housing 201 of device 200 using strap 213) while a majority of a second haptic alert may be provided by first input component 230 of device 200 (e.g., as may be felt generally by a user's finger when interacting with (e.g., touching) first input component 230).

Figure 12:
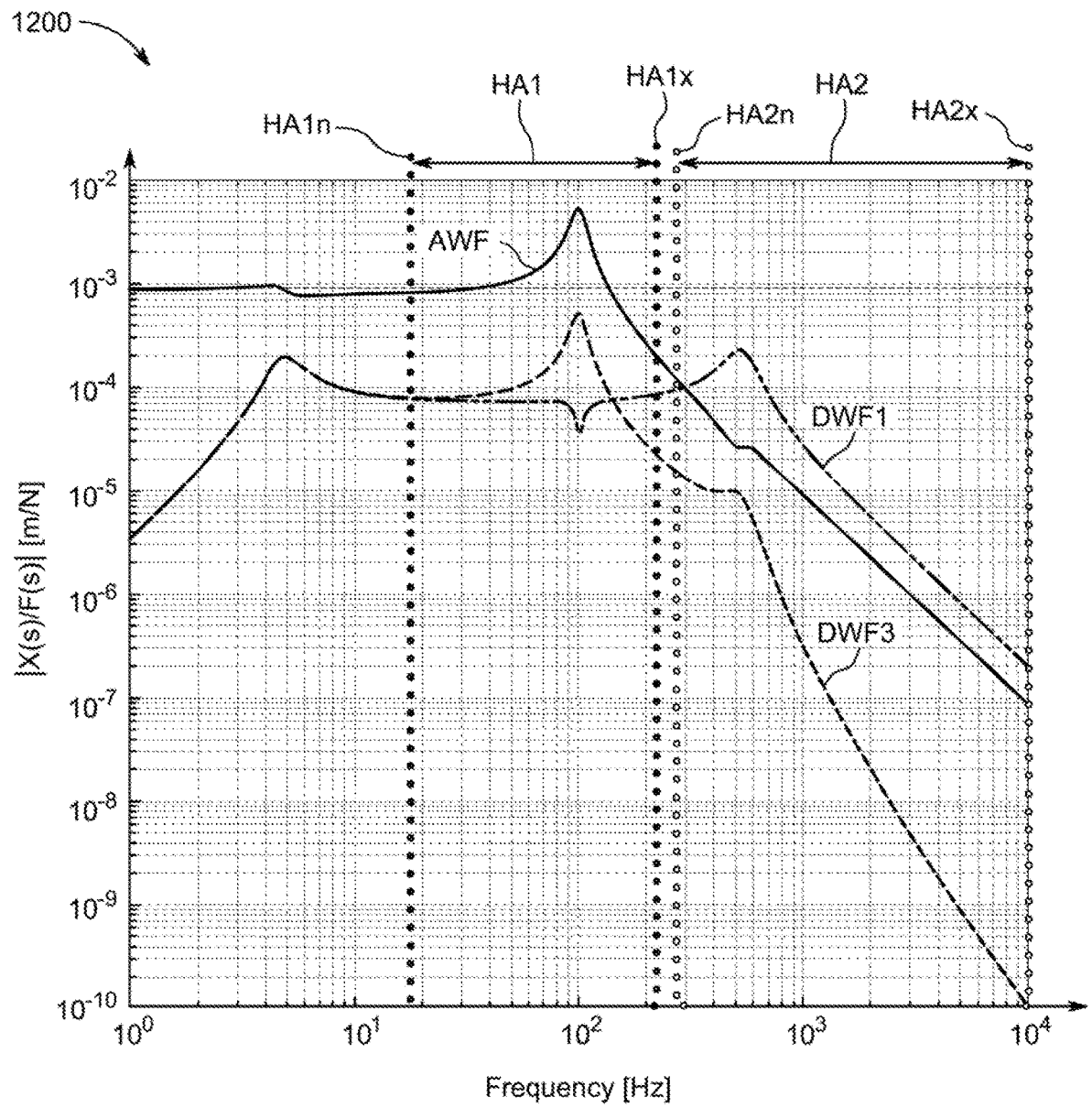
FIG. 12 is a graph illustrating a relationship between an exemplary actuator waveform and exemplary device waveforms.

Generally, three different waveforms may be involved in or associated with any given atom. First, an input waveform IWF (e.g., as shown in FIG. 2) may be provided to the haptic actuator (e.g., as one or more signals from processor 202). Next, the actuator may move in response to the input waveform, thereby generating an actuator waveform AWF (e.g., as shown in FIG. 2). Third, the motion of the haptic actuator (or of a mass of the haptic actuator or of the housing of the haptic actuator) may produce a motion or perceptually distinct motions of the electronic device via one or more distinct coupling mechanisms that may be coupling the haptic actuator and one or more respective portions of device 200, which may be expressed as a device waveform or perceptually distinct device waveforms DWFs. For example, as shown in FIG. 2, a particular haptic actuator waveform AWF of haptic actuator output component 250 may produce a first device waveform DWF1 at first input component 230 via a first haptic-input coupling mechanism 235 that may physically couple haptic actuator output component 250 to first input component 230, a second device waveform DWF2 at second input component 240 via a second haptic-input coupling mechanism 245 that may physically couple haptic actuator output component 250 to second input component 240, a third device waveform DWF3 at least at a first housing coupling location 201$cl$1 of device housing 201 via a first haptic-housing coupling mechanism 275 that may physically couple haptic actuator output component 250 to first housing coupling location 201$cl$1, and a fourth device waveform DWF4 at least at a second coupling location 201$cl$2 of device housing 201 via a second haptic-housing coupling mechanism 285 that may physically couple haptic actuator output component 250 to second housing coupling location 201$cl$2. Differences between such various haptic coupling mechanisms and differences between such various portions of device 200 to which such various haptic coupling mechanisms couple haptic actuator output component 250 may be configured to at least partially dictate variations between such device waveforms for a particular actuator waveform, such that differences between different device waveforms for a particular actuator waveform may enable device 200 to provide multi-modal haptic feedback. It should be appreciated that a device waveform may have an amplitude or an intensity that is different from the amplitude or the intensity of the actuator waveform due to the mass of the device when compared to the mass of the actuator. Further, a device waveform may have a displacement direction that is opposite from the displacement direction of the actuator waveform because the motion of the actuator/mass may cause an opposing motion of the device. Further, the term "output waveform" or "output atom" as used herein, may encompass both actuator waveforms and device waveforms. In some embodiments, a device waveform (or device output waveform) may be substantially identical to an actuator waveform except that its amplitude or intensity may be a percentage of the amplitude or intensity of the actuator waveform, insofar as the device has greater mass than the actuator (or a moving part of the actuator). Generally, "parameters" of a waveform may be those characteristics of a waveform that are measurable and variable. Thought of another way, varying a parameter of a waveform may vary a haptic output of an electronic device. Typically, although not necessarily, a waveform (be it input waveform, actuator waveform, or device waveform) may be described and shown on a graph of any two parameters, where each parameter may correspond to an axis of the graph. Certain parameters may be more useful than others in describing certain waveforms. In some embodiments, these parameters may include, but are not limited to, displacement, frequency, expected motion, shape of the waveform, an envelope associated with the waveform, velocity, intensity or amplitude, zero crossings, force, time, mass of the actuator, mass of an electronic device and/or a housing of the electronic device, number of cycles, momentum of the actuator or the electronic device, and/or the like. Each of these parameters may be viewed with respect to other parameters set forth above and various other parameters. In some embodiments, an intensity of a waveform may include or be associated with an amplitude of a waveform. Thus, the higher the intensity of a particular haptic output or output waveform, the higher the amplitude of the waveform. For example, displacement and velocity may be described with respect to time. Further, insofar as momentum is equal to mass times velocity, a waveform of any graph showing velocity vs. time may also illustrate a scaled version of momentum vs. time, insofar as the masses of the moving parts of the actuator or housing are time-invariant. Likewise, force may be described with respect to mass. In yet other examples, the shape of the atom may include characteristics of a waveform such as, for example, whether the waveform is a square wave, a sinusoidal wave and so on. As shown in FIG. 12, for example, a graph 1200 may show expected motion (e.g., |X(s)/F(s)| (e.g., meters per Newton)) for each one of an actuator waveform AWF, device waveform DWF1, and device waveform DWF3 vs. frequency (e.g., Hertz).

In certain embodiments, the haptic actuators disclosed herein may be tuned or calibrated to provide a consistent feel between various devices and/or different users. More specifically, the electronic device and/or the haptic actuator of the electronic device may be calibrated based on values of parameters that are specific to the electronic device. This may include size of any component(s) of the electronic device, the material(s) of any component(s) (e.g., housing, input component(s), etc.) of the electronic device, differences in tolerances of the various components of the electronic device, expected user force(s) to be applied to any component(s) (e.g., input component interface) of the electronic device during use, and so on. For example, a housing of the electronic device may be available in different sizes. Accordingly, a drive period, a brake period, and/or an audio output may be tuned or calibrated based on the shape and/or size of the housing. In other examples, a duration of a drive period of an input waveform to a haptic actuator output component may be tuned based on (e.g., approximately to match) a resonant or resonance frequency (e.g., resonance frequency and/or a quality factor) of the haptic actuator and/or any other component(s) (e.g., coupling mechanism) present in the electronic device. In still yet other embodiments, the atoms and/or the different periods of the atoms may be tuned to different housings or other components (e.g., input components) of an electronic device. In other implementations, audio output and haptic output may be tuned or otherwise calibrated based on user and/or manufacturer preferences. For example, the intensity of a vibratory and/or audio output may be set by a user via an operating system on the device. The haptic output and the audio output may also be calibrated or tuned based on the material of the housing. For example, the audio output and haptic output may be customized or calibrated in a first manner if the housing is made of or plated with a precious metal (e.g., gold or silver) and customized or calibrated in a second manner if the housing is made of or plated with a second material (e.g., stainless steel or aluminum). Calibration of the haptic actuator may also be based on an operating temperature of the device and/or an overall temperature under which the electronic device is operating. Accordingly, the atoms, and the haptic output caused by the atoms, may be adjusted based on the temperature. In certain other embodiments, the haptic actuator may be calibrated or tuned based on the wear of the haptic actuator. For example, the atom and the haptic output may be adjusted over the life of the electronic device. In other implementations, different types of device waveforms may be tuned or otherwise calibrated based on user and/or manufacturer preferences. For example, the intensity of different device waveforms (e.g., the intensity of device waveform DWF1 and the intensity of device waveform DWF3) may each be set by a user via an operating system on the device or by a manufacturer (e.g., through configuration of coupling mechanisms 235 and 275 and/or through selection of specific actuator waveforms). The haptic outputs may also be calibrated or tuned based on the material of the housing and/or the material of the input component and/or the material of different coupling mechanisms.

While haptic actuator 250 of FIG. 4 may be described as a linear resonant type actuator that may oscillate a spring-mass-damper (e.g., at its resonance frequency), embodiments described herein may also be used with any other suitable type of haptic actuator output component, such as an eccentric rotating mass actuator that may create similar haptic output by spinning an off-center mass. In such embodiments, one full cycle of revolution of the rotating mass may be equivalent to one period of the linear actuator. In yet other embodiments, the actuator may be piezoelectric actuators, shape memory alloys, electroactive polymers, thermal actuators, and/or the like. Moreover, although a wrist wearable electronic device is specifically mentioned and shown with respect to various illustrated embodiments, the embodiments disclosed herein may be used with any number of electronic devices. For example, electronic device 100 and/or 200 may be a mobile telephone, a tablet computer, a laptop computer, or other portable electronic device, a time keeping device, a pair of computerized glasses, a navigation device, a sports device, a portable music player, a health device, a medical device and the like.

Haptic actuator 250 may be physically coupled to device housing 201 of device 200 via one or more haptic-housing coupling mechanisms (e.g., one or more of haptic-housing coupling mechanisms 275 and 285), such that motion of mass(es) 257 (e.g., actuator waveform(s)) within haptic actuator housing 251 of haptic actuator 250 (e.g., due to application of input waveforms (e.g., currents) on haptic actuator 250 that may be used to control or otherwise limit oscillation of the actuator mass (e.g., especially when the actuator mass is at or near resonance frequency) and/or to maintain a resonance frequency of the actuator mass) may be transferred to haptic actuator housing 251 and through one or more of the haptic-housing coupling mechanisms to device housing 201 of wearable electronic device 200 (e.g., as device waveform(s)). In this manner, the motion of the actuator mass may create a perceived stimulus at device housing 201 and/or any other portion of device 200 with which a user may interface (e.g., a user input component). In certain embodiments, the motion may be selective or otherwise concentrated in that it substantially affects only housing 201 or only any other certain component of electronic device 200. In another embodiment, the motion may broadly affect device 200 as a whole. In either event, haptic actuator 250 may produce one or more device waveforms that may provide any suitable tactile output that may be used as an alert or notification or any other suitable conveyance of information to the user.

A single actuator waveform generated from single haptic actuator output component 250 of device 200 may produce different device waveforms at different portions of device 200, and different haptic-device coupling mechanisms (e.g., different haptic-housing coupling mechanisms and/or different haptic-input coupling mechanisms) coupling the single haptic actuator output component 250 to the respective different portions of device 200 (e.g., different device housing portions and/or different device input components) may be used to dictate, at least partially, a relationship between a particular actuator waveform and the different device waveforms produced therefrom at the respective different portions of device 200. By providing or configuring different haptic-device coupling mechanisms with different respective response characteristics or responses (e.g., different compliances and/or pliabilities and/or flexibilities and/or stiffnesses and/or deformation resistances and/or resonance frequencies, etc.) for the respective physical couplings provided between single haptic actuator output component 250 of device 200 and the respective different portions of device 200, those differing responses may be used to define different cutoffs for different parameter ranges for the waveforms that may enable single haptic actuator output component 250 to provide multi-modal haptic feedback. For example, any haptic actuator waveform AWF of haptic actuator output component 250 may produce one, some, or each one of first device waveform DWF1 at first input component 230 via first haptic-input coupling mechanism 235 that may physically couple haptic actuator output component 250 to first input component 230, second device waveform DWF2 at second input component 240 via second haptic-input coupling mechanism 245 that may physically couple haptic actuator output component 250 to second input component 240, third device waveform DWF3 at least at first housing coupling location 201c/1 of device housing 201 via first haptic-housing coupling mechanism 275 that may physically couple haptic actuator output component 250 to first housing coupling location 201c/1, and fourth device waveform DWF4 at least at second coupling location 201c/2 of device housing 201 via second haptic-housing coupling mechanism 285 that may physically couple haptic actuator output component 250 to second housing coupling location 201c/2.

First haptic-input coupling mechanism 235 may be any suitable mechanism or combination of mechanisms that may physically couple any suitable portion(s) of haptic actuator output component 250 (e.g., at least one portion of haptic actuator housing 251) to any suitable portion(s) of input component 230 (e.g., at least one portion of input component 230 that is positioned within internal housing space 209 of device housing 201) with any first haptic-input response characteristic(s) (e.g., response characteristic(s) for an applied force for a degree or degrees of freedom) but that may not physically couple such portion(s) of haptic actuator output component 250 to any portion of device housing 201 itself (e.g., the portion(s) of input component 230 that may be coupled to haptic actuator output component 250 via haptic-input coupling mechanism 235 may not be physically coupled to device housing 201 but may move with respect to device housing 201 (e.g., via housing opening 201oa), where such movement may be caused by a user external to the device interfacing with input component 230 and/or by haptic actuator output component 250 (e.g., via haptic-input coupling mechanism 235)). In some embodiments, one, some, or each element of first haptic-input coupling mechanism 235 may be distinct from haptic actuator output component 250 and/or may be distinct from first input component 230 (e.g., first haptic-input coupling mechanism 235 may be a glue or welding material or the like that physically couples a portion of haptic actuator output component 250 to a portion of first input component 230).

Alternatively, in some embodiments, one, some, or each element of first haptic-input coupling mechanism 235 may be an element of haptic actuator output component 250 and/or may be an element of first input component 230 (e.g., a first element of first haptic-input coupling mechanism 235 may be a female screw thread provided in a passageway through a component (e.g., housing 251) of haptic actuator output component 250, a second element of first haptic-input coupling mechanism 235 may be an opening provided through a component (e.g., button) of first input component 230, and a third element of first haptic-input coupling mechanism 235 may be a male screw thread provided about a shaft that may be screwed through the female screw thread of haptic actuator output component 250 and through the opening in the component of first input component 230 for physically coupling haptic actuator output component 250 to first input component 230).

Second haptic-input coupling mechanism 245 may be any suitable mechanism or combination of mechanisms that may physically couple any suitable portion(s) of haptic actuator output component 250 (e.g., at least one portion of haptic actuator housing 251) to any suitable portion(s) of input component 240 (e.g., at least one portion of input component 240 that is positioned within internal housing space 209 of device housing 201) with any second haptic-input response characteristic(s), but that may not couple such portion(s) of haptic actuator output component 250 to any portion of device housing 201 itself (e.g., the portion(s) of input component 240 coupled to haptic actuator output component 250 via haptic-input coupling mechanism 245 may not be physically coupled to device housing 201 but may move with respect to device housing 201 (e.g., via housing opening 201ob), where such movement may be caused by a user external to the device interfacing with input component 240 and/or by haptic actuator output component 250 (e.g., via haptic-input coupling mechanism 245)). In some embodiments, one, some, or each element of second haptic-input coupling mechanism 245 may be distinct from haptic actuator output component 250 and/or may be distinct from second input component 240. Alternatively, in some embodiments, one, some, or each element of second haptic-input coupling mechanism 245 may be an element of haptic actuator output component 250 and/or may be an element of second input component 240.

First haptic-housing coupling mechanism 275 may be any suitable mechanism or combination of mechanisms that may physically couple any suitable portion(s) of haptic actuator output component 250 (e.g., at least one portion of haptic actuator housing 251) to any suitable portion(s) of device housing 201 (e.g., at least at a portion of an interior surface 201i of device housing 201 at first housing coupling location 201c/1) with any first haptic-housing response characteristic(s). In some embodiments, one, some, or each element of first haptic-housing coupling mechanism 275 may be distinct from haptic actuator output component 250 and/or may be distinct from device housing 201 (e.g., first haptic-housing coupling mechanism 275 may be a glue or welding material or the like that physically couples a portion of haptic actuator output component 250 to a portion of device housing 201). Alternatively, in some embodiments, one, some, or each element of first haptic-housing coupling mechanism 275 may be an element of haptic actuator output component 250 and/or may be an element of device housing 201 (e.g., a first element of first haptic-housing coupling mechanism 275 may be a female screw thread provided in a passageway through a component (e.g., housing 251) of haptic actuator output component 250, a second element of first haptic-housing coupling mechanism 275 may be an opening provided through a component (e.g., tab) of device housing 201, and a third element of first haptic-housing coupling mechanism 275 may be a male screw threaded provided about a screw shaft that may be screwed into the female screw thread of haptic actuator output component 250 and through the opening in the component of device housing 201 for physically coupling haptic actuator output component 250 to device housing 201).

Second haptic-housing coupling mechanism 285 may be any suitable mechanism or combination of mechanisms that may physically couple any suitable portion(s) of haptic actuator output component 250 (e.g., at least one portion of haptic actuator housing 251) to any suitable portion(s) of device housing 201 (e.g., at least at a portion of an interior surface 201i of device housing 201 at second housing coupling location 201c/2) with any second haptic-housing response characteristic(s). In some embodiments, one, some, or each element of second haptic-housing coupling mechanism 285 may be distinct from haptic actuator output component 250 and/or may be distinct from device housing 201. Alternatively, in some embodiments, one, some, or each element of second haptic-housing coupling mechanism 285 may be an element of haptic actuator output component 250 and/or may be an element of device housing 201.

Differences between any suitable response characteristic(s) of various haptic coupling mechanisms and/or differences between the various portions of device 200 to which such various haptic coupling mechanisms may couple haptic actuator output component 250 may be configured to at least partially dictate variations between different device waveforms that may be produced by a particular actuator waveform, such that differences between different device waveforms produced by a particular actuator waveform may enable device 200 to provide multi-modal haptic feedback (e.g., to provide different haptic alerts at different portions of device 200). For example, differences between any suitable compliance characteristic(s) of haptic-input coupling mechanism 235 and any suitable compliance characteristic(s) of haptic-housing coupling mechanism 275 may be configured not only (1) to enable at least one particular parameter (e.g., displacement or movement) of each one of device waveform DWF1 and device waveform DWF3 to differ from one another by no more than any suitable first threshold (e.g., the movement of device waveform DWF1 is less than or equal to 1.5 times (or any other suitable magnitude of) the movement of device waveform DWF3) when those device waveforms are produced by a first particular actuator waveform AWF or by any one of a first particular type of actuator waveform AWF (e.g., a first actuator waveform AWF with a frequency parameter within a first range of frequencies) but also (2) to enable at least one particular parameter (e.g., displacement or movement) of each one of device waveform DWF1 and device waveform DWF3 to differ from one another by more than any suitable second threshold (e.g., the movement of device waveform DWF1 is more than or equal to 10 times (or any other suitable magnitude of) the movement of device waveform DWF3) when those device waveforms are produced by a second particular actuator waveform AWF or by any one of a second particular type of actuator waveform AWF (e.g., a second actuator waveform AWF with a frequency parameter within a second range of frequencies). As another example, differences between any suitable resonance frequency characteristic(s) (e.g., the fundamental frequency) of haptic-input coupling mechanism 235 and any suitable resonance frequency characteristic(s) (e.g., the fundamental frequency) of haptic-housing coupling mechanism 275 (e.g., as compared to one another and/or as compared to any suitable resonance frequency characteristic(s) (e.g., the fundamental frequency) of haptic actuator output component 250) may be configured not only (1) to enable at least one particular parameter (e.g., displacement or movement) of each one of device waveform DWF1 and device waveform DWF3 to differ from one another by no more than any suitable first threshold (e.g., the movement of device waveform DWF1 is within a certain first magnitude (e.g., a factor of 1.5) of the movement of device waveform DWF3) when those device waveforms are produced by a first particular actuator waveform AWF or by any one of a first particular type of actuator waveform AWF (e.g., a first actuator waveform AWF with a frequency parameter within a first range of frequencies) but also (2) to enable at least one particular parameter (e.g., displacement or movement) of each one of device waveform DWF1 and device waveform DWF3 to differ from one another by more than any suitable second threshold (e.g., the movement of device waveform DWF1 is greater than the movement of device waveform DWF3 by at least a second magnitude (e.g., a factor of 10)) when those device waveforms are produced by a second particular actuator waveform AWF or by any one of a second particular type of actuator waveform AWF (e.g., a second actuator waveform AWF with a frequency parameter within a second range of frequencies). Such a configuration may be operative to enable device 200 to provide not only a first type of haptic alert (e.g., a perception that each one of device housing 201 at portion 201c/1 and input component 230 are being moved by the same or similar device waveforms (e.g., the entirety of device 200 is providing substantially the same haptic feedback)) when haptic actuator output component 250 is generating a first actuator waveform AWF with a frequency parameter within a first range of frequencies, but also a second type of haptic alert (e.g., a perception that input component 230 is being moved by a more powerful device waveform than device housing 201 at portion 201c/1 (e.g., input component 230 is providing a localized haptic feedback that is distinguishable from any haptic feedback being provided by device housing 201)) when haptic actuator output component 250 is generating a second actuator waveform AWF with a frequency parameter within a second range of frequencies (e.g., one or more parameters of an AWF may be selected or adjusted by making an appropriate selection or adjustment to an IWF provided to the haptic actuator (e.g., by an appropriate application 103 or 203)). As just one particular example, as shown by graph 1200 of FIG. 12, device 200 may be configured to provide a first haptic alert HA1 when haptic actuator output component 250 is providing an actuator waveform AWF with a frequency parameter within a first range of frequencies that may be defined to extend between a minimum frequency parameter value HA1n and a maximum frequency parameter value HA1x (e.g., a range within which the movement of device waveform DWF1 produced by actuator waveform AWF is less than or equal to any suitable first haptic threshold magnitude of (e.g., 1.5 times (or any other suitable magnitude of)) the movement of device waveform DWF3 produced by actuator waveform AWF), and device 200 may also be configured to provide a second haptic alert HA2 when haptic actuator output component 250 is providing an actuator waveform AWF with a frequency parameter within a second range of frequencies that may be defined to extend between a minimum frequency parameter value HA2n and a maximum frequency parameter value HA2x (e.g., a range within which the movement of device waveform DWF1 produced by actuator waveform AWF is at least greater than any suitable second haptic threshold magnitude of (e.g., 10 times (or any other suitable magnitude of)) the movement of device waveform DWF3 produced by actuator waveform AWF). Such minimum and maximum parameter values HA1n, HA1x, HA2n, and HA2x may be dependent not only on the value of each one of the first and second haptic threshold magnitudes (e.g., as may be defined by a manufacturer of device 200 and/or by a user for providing a desired haptic feedback experience), but also on (1) any suitable differences between any suitable compliance characteristic(s) of haptic-input coupling mechanism 235 and any suitable compliance characteristic(s) of haptic-housing coupling mechanism 275 and/or (2) any suitable differences between any suitable resonance frequency characteristic(s) (e.g., the fundamental frequency) of haptic-input coupling mechanism 235 and any suitable resonance frequency characteristic(s) (e.g., the fundamental frequency) of haptic-housing coupling mechanism 275 (e.g., as compared to one another and/or as compared to any suitable resonance frequency characteristic(s) (e.g., the fundamental frequency) of haptic actuator output component 250).

Any suitable differences between any suitable response characteristic(s) (e.g., compliance characteristic(s) and/or resonance frequency characteristic(s) and/or the like) of a first haptic coupling mechanism (e.g., a haptic-input coupling mechanism) and such suitable response characteristic(s) (e.g., compliance characteristic(s) and/or resonance frequency characteristic(s) and/or the like) of a second haptic coupling mechanism (e.g., a haptic-housing coupling mechanism) may be provided by different haptic coupling mechanisms of an electronic device in order to enable that electronic device to provide multiple modes of haptic feedback using a single haptic actuator, where, for example, such multi-modal haptic feedback may include a first mode in which the entirety of the device may be perceived by a device user to be providing substantially the same haptic feedback and a second mode in which a particular portion of the device (e.g., a user input component) may be perceived by a device user to be providing a localized haptic feedback that is distinguishable from (e.g., greater than) any haptic feedback being provided by another portion of the device (e.g., a majority of the device's housing). For example, as shown at least with respect to FIGS. 5-11, various types of coupling mechanisms of a single haptic actuator of an electronic device may be provided such that one of the coupling mechanisms may provide a physical coupling with different response or compliance and/or frequency characteristics than may be provided by a physical coupling provided by another one of the coupling mechanisms (e.g., such that a physical coupling provided by a haptic-housing coupling mechanism between the single haptic actuator and a device housing of the electronic device may be a more compliant (e.g., less stiff) physical coupling (e.g., in at least one degree of freedom) than a physical coupling provided by a haptic-input coupling mechanism between the single haptic actuator and a user input component of the electronic device and/or such that a physical coupling provided by a haptic-housing coupling mechanism between the single haptic actuator and a device housing of the electronic device may have a different resonance frequency response (e.g., a different response to a particular applied waveform) than that of a physical coupling provided by a haptic-input coupling mechanism between the single haptic actuator and a user input component of the electronic device (e.g., such that when a particular type of parameter (e.g., frequency parameter) of the actuator waveform AWF generated by the single haptic actuator is increased from within a first range to within a second range, the device may change from providing a first haptic alert of a first mode in which substantially the entirety of the device (e.g., the device housing and the user input component) may be perceived by a device user to be providing substantially the same haptic feedback to providing a second haptic alert of a second mode in which a specific portion of the device (e.g., the user input component of the device) may be perceived by the device user to be providing a localized haptic feedback that is distinguishable from (e.g., greater than) any haptic feedback being provided by another portion of the device (e.g., a majority of the device's housing))).

Figure 5:
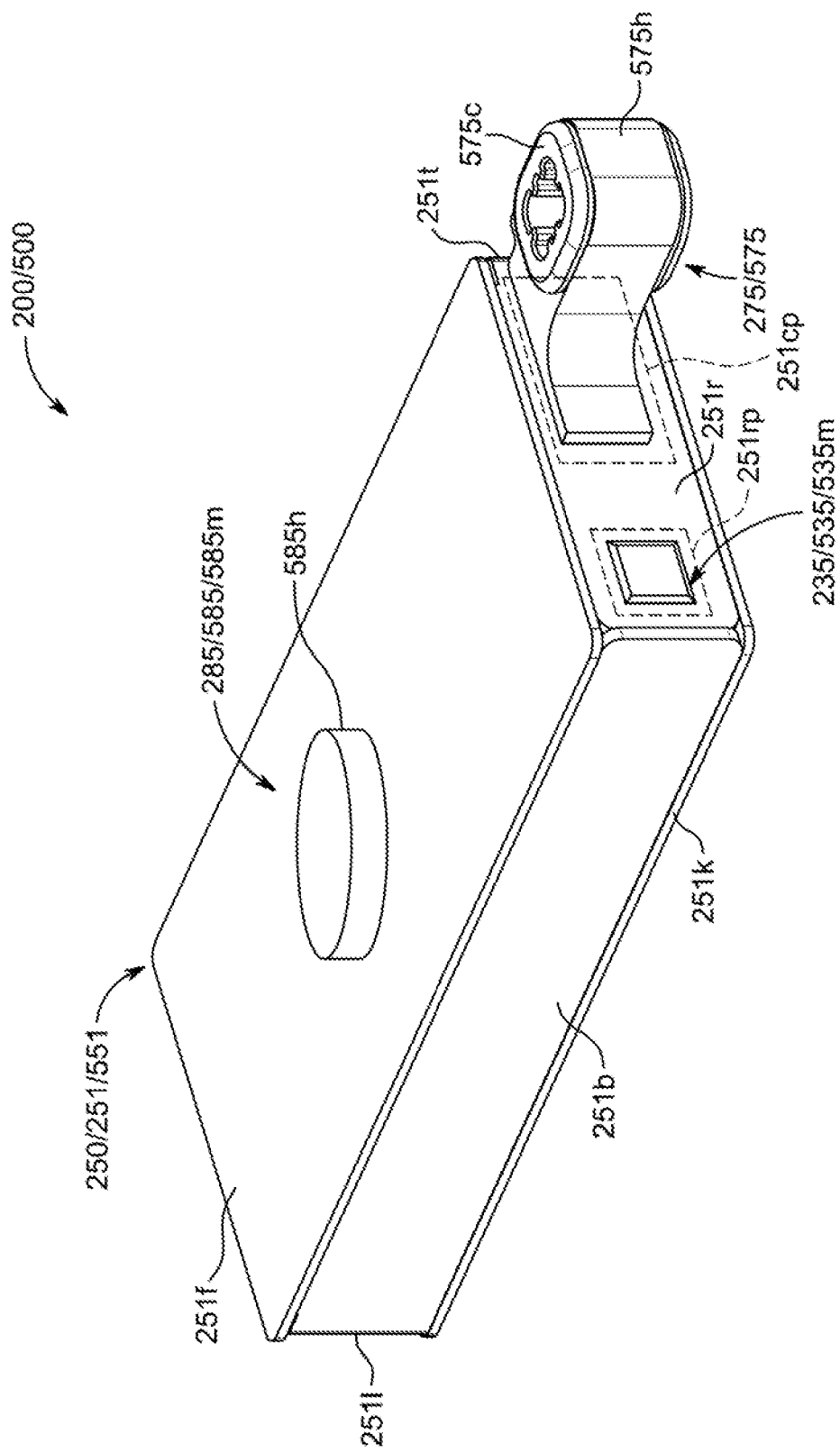
FIG. 5 is a front, right, bottom perspective view of an exemplary multi-modal haptic feedback assembly of the electronic device of FIGS. 2-4.

FIG. 5 shows a first exemplary multi-modal haptic feedback assembly 500 that may provide actuator housing 251 of haptic actuator output component 250 of electronic device 200 with at least two haptic coupling mechanisms having different response characteristics. In some embodiments, as shown in FIG. 5, for example, actuator housing 251 may be any suitable three-dimensional shape that may generally be described as providing a top wall 251t, a bottom wall 251b that may be opposite top wall 251t, a left wall 251l, a right wall 251r that may be opposite left wall 251l, a front wall 251f, and a back wall 251k that may be opposite front wall 251f, and multi-modal haptic feedback assembly 500 may be configured to provide actuator housing 251 as an actuator housing structure 551, haptic-input coupling mechanism 235 as a first haptic coupling mechanism 535, and haptic-housing coupling mechanism 275 as a second haptic coupling mechanism 575 that may have different response characteristics than first haptic coupling mechanism 535. Actuator housing structure 551 may be configured to provide actuator housing 251 as a unitary structure that may include at least a portion of each actuator housing wall being integral with or rigidly coupled to or substantially rigidly coupled (e.g., welded) to one, two, three, four, or each other actuator housing wall except the actuator housing wall opposite thereto. Haptic coupling mechanism 535 may be configured to provide haptic-input coupling mechanism 235 for coupling any suitable portion of any suitable user input component (e.g., user input component 230) of device 200 to any suitable portion of actuator housing structure 551 (e.g., wall 251r) with a physical coupling that may be rigid or substantially rigid. For example, haptic coupling mechanism 535 may include any suitable rigid coupling material or mechanism 535m (e.g., a welded joint or glue or heat activated epoxy or female/male threaded screw components and/or any other suitable mechanism) for rigidly or substantially rigidly coupling any suitable portion 251rp of any suitable wall (e.g., wall 251r) of actuator housing 251 to any suitable portion (not shown) of input component 230. Haptic coupling mechanism 575 may be configured to provide haptic-housing coupling mechanism 275 for physically coupling any suitable portion of device housing 201 (e.g., an internal surface 201i of device housing 201 at first housing coupling location 201cl1) of device 200 to any suitable portion of actuator housing structure 551 (e.g., wall 251r) with a physical coupling that may be less rigid (e.g., more compliant) (e.g., by any suitable amount) than the physical coupling provided by haptic coupling mechanism 535 between actuator housing structure 551 and input component 230. For example, haptic coupling mechanism 575 may include a female screw thread or grommet 575c of any suitable compliant material (e.g., a cushion or elastomeric material) that may be rigidly or substantially rigidly coupled to any suitable portion 251cp of any suitable wall (e.g., wall 251*r*) of actuator housing 251 (e.g., via any suitable rigid holder 575*h* that may be rigidly coupled to portion 251*cp*), where female screw thread or grommet 575*c* may be operative to receive any rigid or substantially rigid element (e.g., male screw thread or hook (not shown)) of internal surface 201*i* of device housing 201 at first housing coupling location 201*c*/1 for physically coupling device housing 201 to actuator housing 251 in a more compliant fashion than haptic coupling mechanism 535 may physically couple input component 230 to actuator housing 251. Therefore, a soft mounting surface may be provided by grommet 575*c* for establishing a compliant coupling between actuator housing 251 and device housing 201. While grommet 575*c* may be shown in FIG. 5 as a female element that may be rigidly coupled to actuator housing 251, it is to be appreciated that the soft mounting surface of element 575*c* may instead be a female element rigidly coupled to device housing 201 for receiving any element of actuator housing 251, or a soft male element that may be rigidly received by a rigid female element, such that only one element of the physical coupling may be provided by a soft or compliant mechanism for enabling haptic coupling mechanism 575 to be more compliant or less rigid than haptic coupling mechanism 535, which may be rigid or substantially rigid. Alternatively or additionally, as shown, multi-modal haptic feedback assembly 500 may be configured to provide haptic-housing coupling mechanism 285 as a third haptic coupling mechanism 585 that may have different response characteristics (e.g., less stiff characteristics) than first haptic coupling mechanism 535. Haptic coupling mechanism 585 may be configured to provide haptic-housing coupling mechanism 285 for coupling any suitable portion of device housing 201 (e.g., an internal surface 201*i* of device housing 201 at second housing coupling location 201*c*/2) of device 200 to any suitable portion of actuator housing structure 551 (e.g., wall 251*f*) with a less rigid (e.g., more compliant) physical coupling than the physical coupling between actuator housing structure 551 and input component 230 provided by haptic coupling mechanism 535. For example, haptic coupling mechanism 585 may include a cushion 585*m* of any suitable compliant material (e.g., a cushion or elastomeric material) that may be rigidly or substantially rigidly coupled to any suitable portion of any suitable wall (e.g., wall 251*f*) of actuator housing 251 (e.g., via any suitable rigid holding mechanism (e.g., adhesive) that may adhere a portion of cushion adhesive 585*m* to actuator housing 251) and that may be rigidly or substantially rigidly coupled to any suitable portion of any suitable wall (e.g., internal wall 201*i* at housing coupling location 201*c*/2) of device housing 201 (e.g., via any suitable rigid holding mechanism (e.g., adhesive) that may adhere a portion of cushion adhesive 585*m* to device housing 201) for physically coupling device housing 201 to actuator housing 251 in a more compliant fashion than haptic coupling mechanism 535 may physically couple input component 230 to actuator housing 251 (e.g., due to any suitable compliance characteristics of the material(s) of cushion 585*m* (e.g., a double-sided tape with a cushioned body)). A device housing wall through which input component is exposed (e.g., by opening 201*oa*) does not have to be the same device housing wall to which a haptic-housing coupling mechanism may physically couple the actuator housing, but may be a completely different device housing wall (e.g., adjacent wall or opposite wall). Instead, a physical coupling of the device housing to the actuator housing may be any suitable distance from a physical coupling of the input component to the actuator housing.

Figure 6:
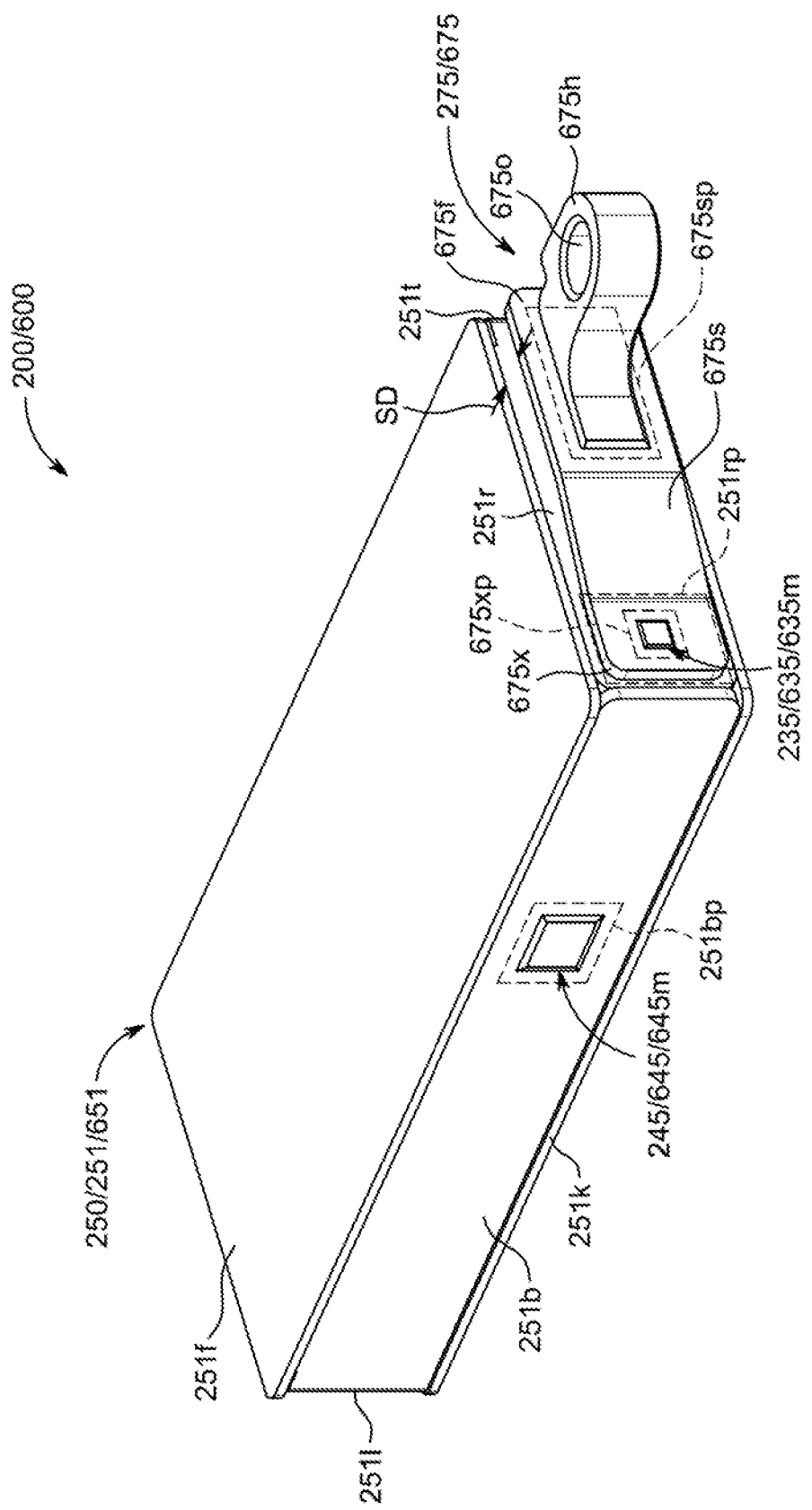
FIG. 6 is a front, right, bottom perspective view of another exemplary multi-modal haptic feedback assembly of the electronic device of FIGS. 2-4.
Figure 6A:
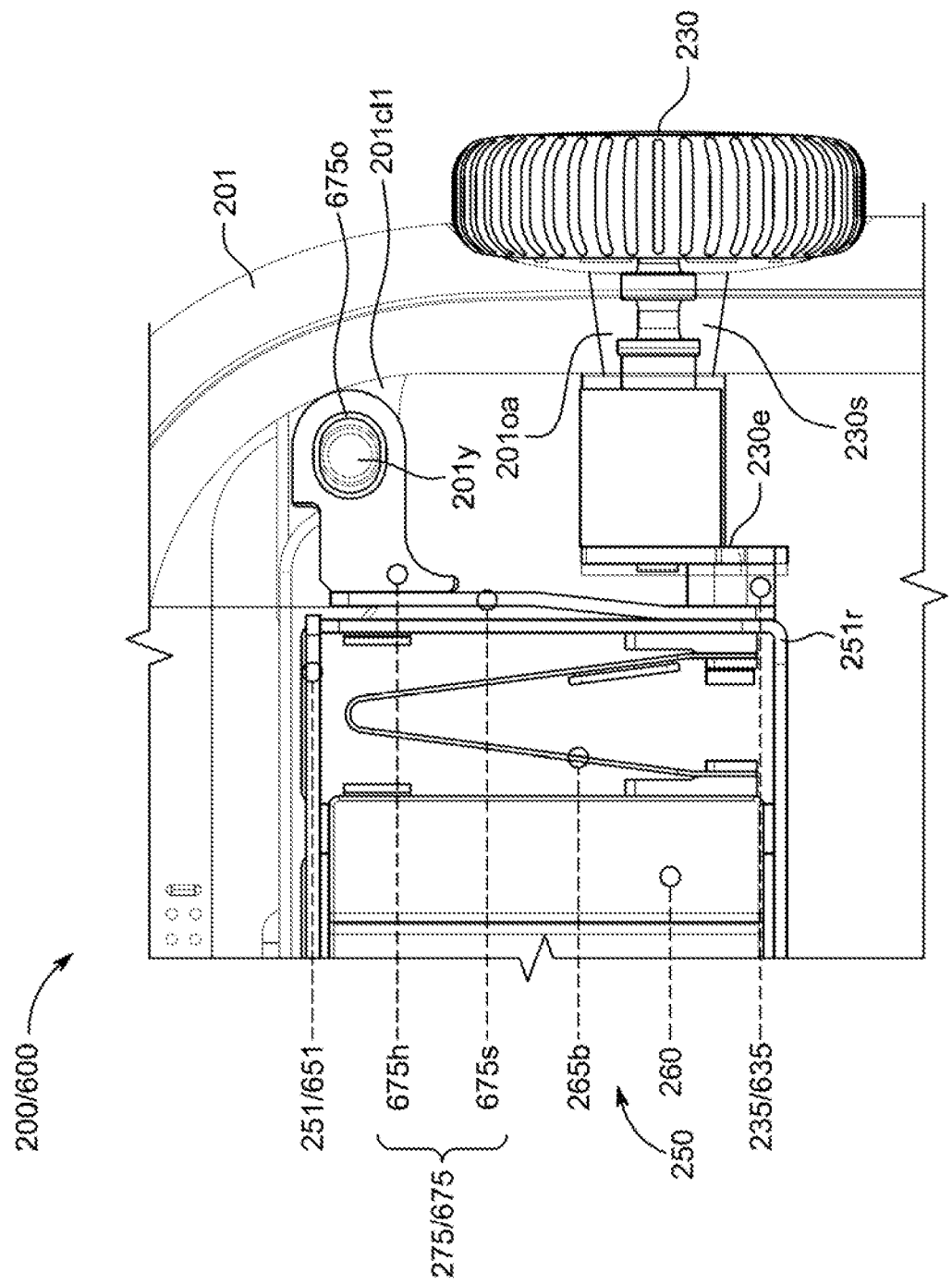
FIG. 6A is a front view of a portion of the electronic device of FIGS. 2-4 with the multi-modal haptic feedback assembly of FIG. 6 when assembled.

FIG. 6 shows an exemplary multi-modal haptic feedback assembly 600 that may provide actuator housing 251 of haptic actuator output component 250 of electronic device 200 with at least two haptic coupling mechanisms having different response characteristics. In some embodiments, as shown in FIG. 6, for example, actuator housing 251 may be any suitable three-dimensional shape that may generally be described as providing a top wall 251*t*, a bottom wall 251*b* that may be opposite top wall 251*t*, a left wall 251*l*, a right wall 251*r* that may be opposite left wall 251*l*, a front wall 251*f*, and a back wall 251*k* that may be opposite front wall 251*f*, and multi-modal haptic feedback assembly 600 may be configured to provide actuator housing 251 as an actuator housing structure 651, haptic-input coupling mechanism 235 as a first haptic coupling mechanism 635, and haptic-housing coupling mechanism 275 as a second haptic coupling mechanism 675 that may have different response characteristics than first haptic coupling mechanism 635. Actuator housing structure 651 may be configured to provide actuator housing 251 as a unitary structure that may include at least a portion of each actuator housing wall being integral with or rigidly coupled to or substantially rigidly coupled (e.g., welded) to one, two, three, four, or each other actuator housing wall except the actuator housing wall opposite thereto. Haptic coupling mechanism 675 may be configured to provide haptic-housing coupling mechanism 275 for physically coupling any suitable portion of device housing 201 (e.g., an internal surface 201*i* of device housing 201 at first housing coupling location 201*c*/1) of device 200 to any suitable portion of actuator housing structure 651 (e.g., wall 251*r*) with a physical coupling that may be less rigid (e.g., more compliant) (e.g., by any suitable amount) or otherwise providing a different response than the physical coupling provided by haptic coupling mechanism 635 between actuator housing structure 651 and input component 230. For example, haptic coupling mechanism 675 may include any suitable flexure or spring for providing compliance to the physical coupling, such as a bow spring, a cantilever spring, a leaf spring, or any other suitable flexure or spring. For example, as shown, haptic coupling mechanism 675 may include a cantilever spring 675*s* (e.g., a spring made of metal or any other suitable material that may exhibit the compliant functionality of such a spring), which may extend from a first fixed end 675*x* to a second free end 675*f*, where first fixed end 675*x* may be rigidly anchored to actuator housing 251 in any suitable manner (e.g., by a weld joint or any other suitable mechanism (e.g., at any suitable portion 251*rp* of any suitable wall (e.g., wall 251*r*) of actuator housing 251)) and where second free end 675*f* may be positioned free in space with respect to actuator housing 251 (e.g., by a distance SD) when no external force is being applied to spring 675*s*. A device housing coupling feature of haptic coupling mechanism 675 for coupling to device housing 201 may be coupled to spring 675*s* at any portion of spring 675*s* proximate to free end 675*f*, such as a rigid holder 675*h* that may be rigidly coupled to portion 675*sp* of spring 675*s* adjacent free end 675*f*, where holder 675*h* may be provided with any suitable mechanism for physically coupling with device housing 201, such as a holder opening 675*o* that may be operative to receive any rigid or substantially rigid element of device housing 201 at first housing coupling location 201*c*/1 (e.g., a male screw thread or hook or the like (e.g., as shown in FIG. 6A, a coupling feature 201*y* may extend between a first end that may be fixed to internal surface 201*i* of device housing 201 and a second free end that may be configured to be passed through holder opening 675*o*)) for physically coupling device housing 201 to actuator housing 251 via compliant spring 675s. Alternatively, spring 675s itself may be configured to provide any suitable device housing coupling feature for coupling to device housing 201 (e.g., a portion of free end 675f may be bent or curled or otherwise shaped to provide a holder opening similar to opening 675o such that a separate component 675h may not be rigidly coupled to spring 675s). In some embodiments, a female screw thread or grommet of any suitable compliant material (e.g., a cushion or elastomeric material) similar to grommet 575c may be provided in holder opening 675o for providing additional compliance to haptic coupling mechanism 675. Haptic coupling mechanism 635 may be configured to provide haptic-input coupling mechanism 235 for coupling any suitable portion of any suitable user input component (e.g., user input component 230) of device 200 to any suitable portion of actuator housing structure 651 (e.g., wall 251r) with a physical coupling that may be rigid or substantially rigid. For example, haptic coupling mechanism 635 may include any suitable rigid coupling material or mechanism 635m (e.g., a welded joint or glue or heat activated epoxy or female/male threaded screw components and/or any other suitable mechanism) for rigidly or substantially rigidly coupling any suitable portion 251rp of any suitable wall (e.g., wall 251r) of actuator housing 251 to any suitable portion of input component 230 (e.g., to an end portion 230e of input component 230, as shown in FIG. 6A), either directly (e.g., adjacent fixed end 675x of spring 675s) or via fixed end 675x of spring 675s (e.g., at a portion 675xp of fixed end 675x). Alternatively, haptic coupling mechanism 635 may rigidly couple a portion of input component 230 to actuator housing 251 along another actuator housing wall that may be different than the actuator housing wall at which spring 675s may be coupled (e.g., wall 251b rather than wall 251r). For example, as shown, multi-modal haptic feedback assembly 600 may be configured to provide haptic-input coupling mechanism 245 as a haptic coupling mechanism 645 that may have different response characteristics (e.g., more stiff characteristics) than haptic-housing coupling mechanism 675. For example, haptic coupling mechanism 645 may include any suitable rigid coupling material or mechanism 645m (e.g., a welded joint or glue or heat activated epoxy or female/male threaded screw components and/or any other suitable mechanism) for rigidly or substantially rigidly coupling any suitable portion 251bp of any suitable wall (e.g., wall 251b) of actuator housing 251 to any suitable portion (not shown) of input component 230 or input component 240 or otherwise.

In some embodiments, haptic coupling mechanism 635 may be configured to provide haptic-input coupling mechanism 235 that may not necessarily be more rigid or less stiff than haptic coupling mechanism 675 providing haptic-housing coupling mechanism 275. However, haptic-input coupling mechanism 635 may be configured with any suitable response characteristic(s) that may be different than such response characteristic(s) of haptic-housing coupling mechanism 675 (e.g., directly and/or relative to such response characteristic(s) of haptic actuator output component 250) such that the device waveform of the device housing produced by the actuator waveform of the actuator housing and the device waveform of the input component produced by the actuator waveform of the actuator housing may be separated through frequency separation (e.g., at least at certain frequencies of the actuator waveform). For example, as shown in FIG. 6A, haptic actuator 250 may include at least flexure bearing 265b that may mount a side of field member 260 with mass 257 to be reciprocally movable within actuator housing 251/651. Flexure bearing or mass flexure 265b may be any suitable spring or the like that may combine with field member 260 and actuator housing 251/651 to provide a linear resonant actuator ("LRA"), where an electrical signal through the LRA's coils may force the mass up and down (or the like along a single linear axis), resulting in a force that may cause displacement. The combination of flexure stiffness, mass and magnet/coil size may cause the LRA to have at least a natural resonance frequency or a lowest resonance frequency or a fundamental frequency. In some embodiments, haptic-housing coupling mechanism 675 may be configured to couple haptic actuator 250 to device housing 201 with a haptic-housing coupling resonance frequency that may be different than (e.g., greater than) the natural resonance frequency or lowest resonance frequency or fundamental frequency of haptic actuator 250 (e.g., of its LRA). For example, these frequencies of haptic-housing coupling mechanism 675 and of the LRA of haptic actuator 250 may be configured with respect to one another such that haptic actuator 250 may drive device housing 201 via haptic-housing coupling mechanism 675 in a related manner (e.g., such that housing 201 and actuator 250 move substantially together) before a first haptic threshold magnitude, such as while haptic actuator output component 250 is providing an actuator waveform AWF with a frequency parameter within a first range of frequencies that may be defined to extend between a minimum frequency parameter value HA1n and a maximum frequency parameter value HA1x, yet these frequencies of haptic-housing coupling mechanism 675 and of the LRA of haptic actuator 250 may also be configured with respect to one another such that haptic actuator 250 may drive device housing 201 via haptic-housing coupling mechanism 675 in a distinct manner (e.g., such that housing 201 and actuator 250 move independently from each other) after a second haptic threshold magnitude that may be equal to or greater than the first haptic threshold, such as while haptic actuator output component 250 is providing an actuator waveform AWF with a frequency parameter within a second range of frequencies that may be defined to extend between a minimum frequency parameter value HA2n and a maximum frequency parameter value HA2x. Haptic-input coupling mechanism 635 may be configured to couple haptic actuator 250 to input component 230 with a haptic-input coupling resonance frequency that may be different than the natural resonance frequency or lowest resonance frequency or fundamental frequency of haptic actuator 250 (e.g., of its LRA) in a different way than the haptic-housing coupling resonance frequency of haptic-housing coupling mechanism 675 may differ from the natural resonance frequency or lowest resonance frequency or fundamental frequency of haptic actuator 250.

Figure 7:
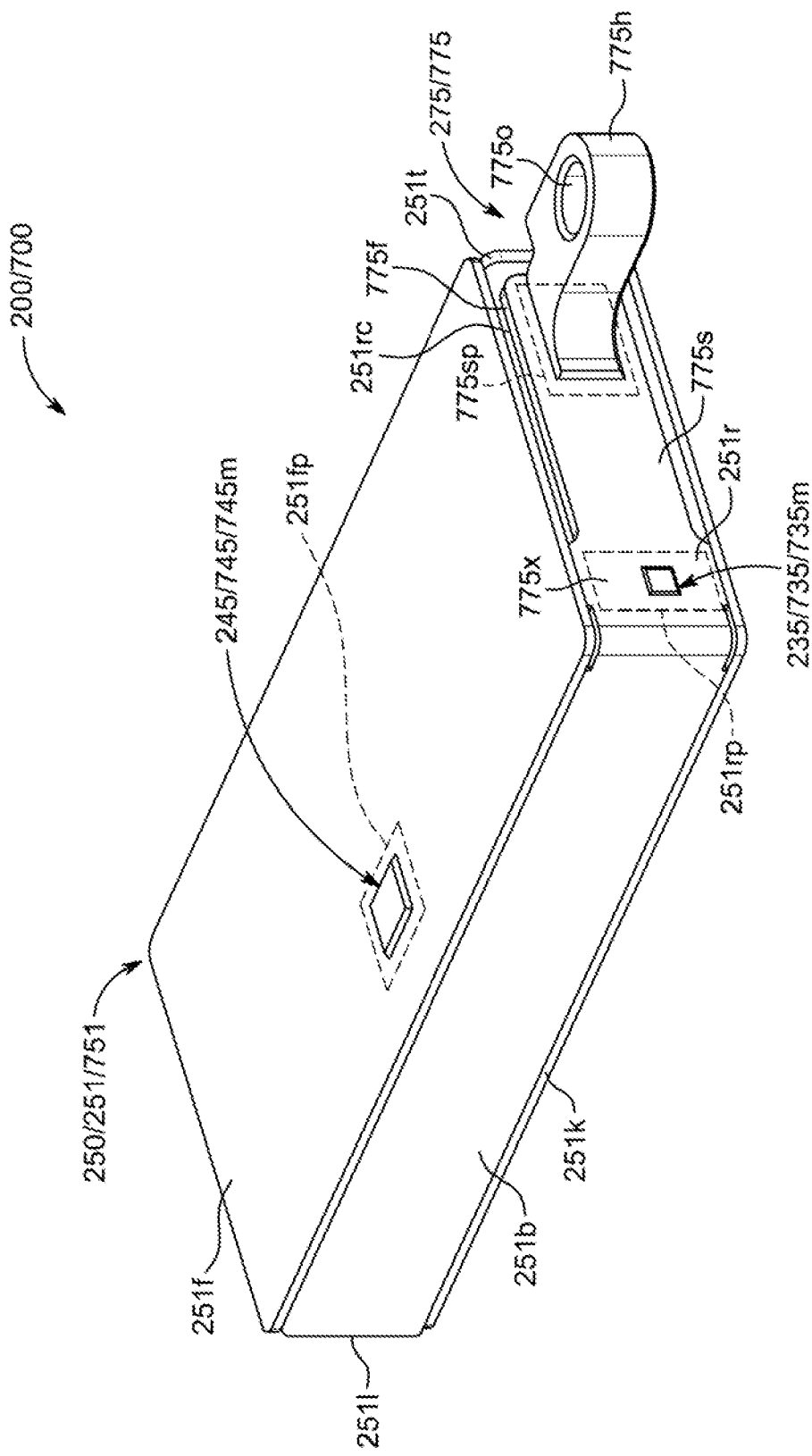
FIG. 7 is a front, right, bottom perspective view of another exemplary multi-modal haptic feedback assembly of the electronic device of FIGS. 2-4.
Figure 10:
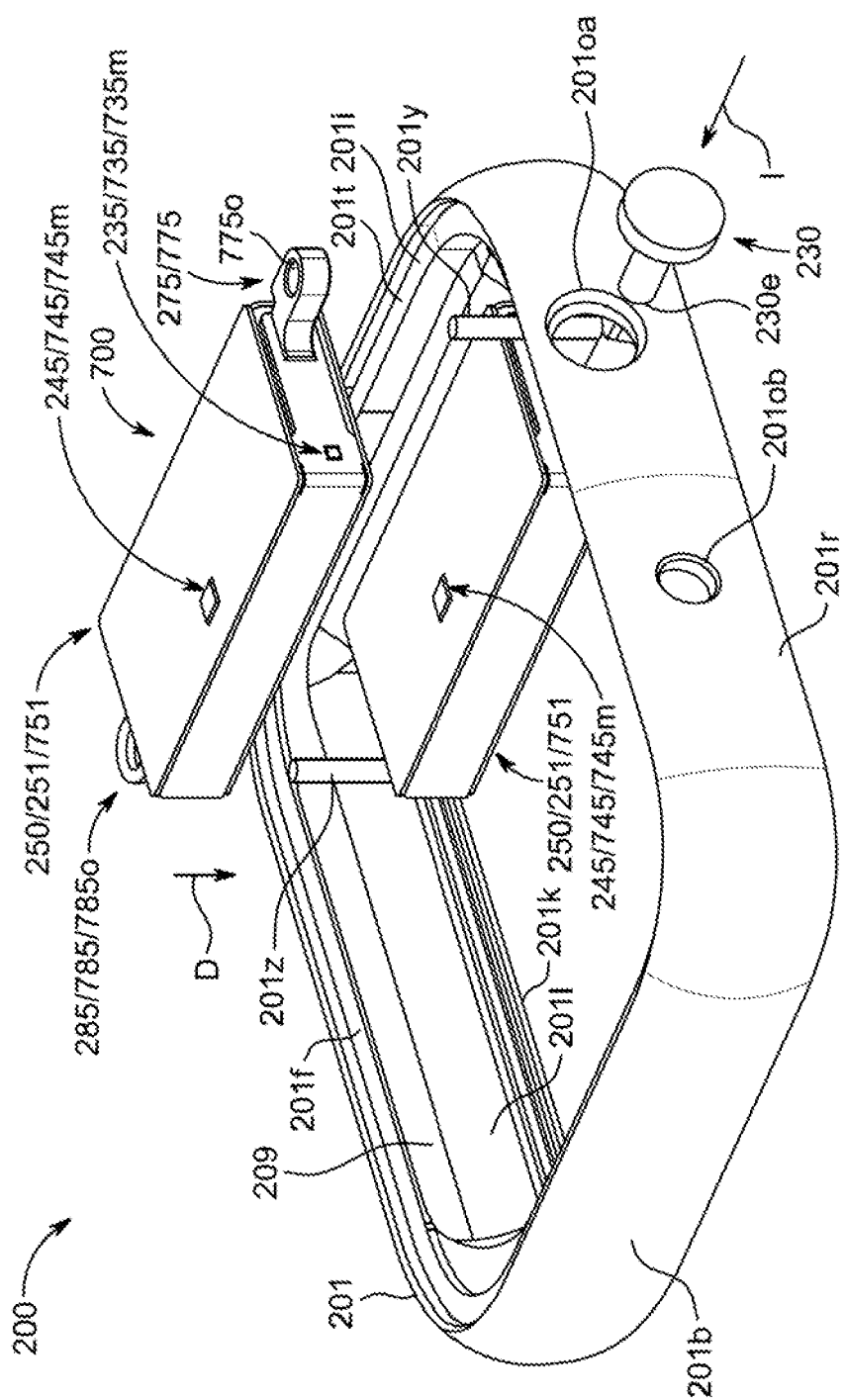
FIG. 10 is a front, right, bottom perspective view of a portion of the electronic device of FIGS. 2-4 with the multi-modal haptic feedback assembly of FIG. 7 in two different stages of assembly.

FIG. 7 shows an exemplary multi-modal haptic feedback assembly 700 that may provide actuator housing 251 of haptic actuator output component 250 of electronic device 200 with at least two haptic coupling mechanisms having different response characteristics. In some embodiments, as shown in FIG. 7, for example, actuator housing 251 may be any suitable three-dimensional shape that may generally be described as providing a top wall 251t, a bottom wall 251b that may be opposite top wall 251t, a left wall 251l, a right wall 251r that may be opposite left wall 251l, a front wall 251f, and a back wall 251k that may be opposite front wall 251f, and multi-modal haptic feedback assembly 700 may be configured to provide actuator housing 251 as an actuator housing structure 751, haptic-input coupling mechanism 235 as a first haptic coupling mechanism 735, and haptic-housing coupling mechanism 275 as a second haptic coupling mechanism 775 that may have different response characteristics than first haptic coupling mechanism 735. Actuator housing structure 751 may be configured to provide actuator housing 251 as a unitary structure that may include at least a portion of each actuator housing wall being integral with or rigidly coupled to or substantially rigidly coupled (e.g., welded) to one, two, three, four, or each other actuator housing wall except the actuator housing wall opposite thereto. Alternatively, as shown, two or more walls may be provided by a single unitary structure (e.g., bottom wall 251b and right wall 251r of actuator housing structure may be provided as a single "L-shaped" or bent component). Haptic coupling mechanism 775 may be configured to provide haptic-housing coupling mechanism 275 for physically coupling any suitable portion of device housing 201 (e.g., an internal surface 201i of device housing 201 at first housing coupling location 201cl1) of device 200 to any suitable portion of actuator housing structure 751 (e.g., wall 251f and/or wall 251k and/or wall 251b and/or wall 251r) with a physical coupling that may be less rigid (e.g., more compliant) (e.g., by any suitable amount) than the physical coupling provided by haptic coupling mechanism 735 between actuator housing structure 751 and input component 230. For example, haptic coupling mechanism 775 may include any suitable portion of any suitable actuator housing wall being configured as any suitable flexure or spring for providing compliance to the physical coupling, such as a bow spring, a cantilever spring, a leaf spring, or any other suitable flexure or spring. For example, as shown, haptic coupling mechanism 775 may provide a cantilever spring 775s with a portion of actuator housing wall 251r, which may extend from a first fixed end 775x to a second free end 775f, where first fixed end 775x may be a portion of actuator housing wall 251r that may be rigidly coupled to any other wall of haptic actuator 250 (e.g., wall 251f and/or wall 251k and/or wall 251b) such that movement of first fixed end 775x may be rigidly fixed to movement of a remainder of actuator housing 251 except for the movement of free end 775f of spring 775s, and where second free end 775f may be positioned free in space with respect to a remainder of actuator housing 251 (e.g., due to a cutout 251rc made in actuator housing 251 to provide spring 775s) when no external force is being applied to spring 775s. A device housing coupling feature of haptic coupling mechanism 775 for coupling to device housing 201 may be coupled to spring 775s at any portion of spring 775s proximate to free end 775f, such as a rigid holder 775h that may be rigidly coupled to portion 775sp of spring 775s adjacent free end 775f, where holder 775h may be provided with any suitable mechanism for physically coupling with device housing 201, such as a holder opening 775o that may be operative to receive any rigid or substantially rigid element (e.g., male screw thread or hook or the like) of internal surface 201i of device housing 201 at first housing coupling location 201cl1 for physically coupling device housing 201 to actuator housing 251 via compliant spring 775s. For example, as shown in FIG. 10, a male screw thread or hook or other suitable coupling feature 201y of haptic coupling mechanism 775 may be provided by an internal surface 201i of device housing 201 (e.g., coupling feature 201y may extend between a first end that may be fixed to internal surface 201i of device housing 201 and a second free end that may be configured to be passed through holder opening 775o when haptic feedback assembly 700 may be moved in the direction of arrow D into position within internal housing space 209 of device housing 201). Alternatively, spring 775s itself may be configured to provide any suitable device housing coupling feature for coupling to device housing 201 (e.g., a portion of free end 775f may be bent or curled or otherwise shaped to provide a holder opening similar to opening 775o such that a separate component 775h may not be rigidly coupled to spring 775s). In some embodiments, a female screw thread or grommet of any suitable compliant material (e.g., a cushion or elastomeric material) similar to grommet 575c may be provided in holder opening 775o for providing additional compliance to haptic coupling mechanism 775. Haptic coupling mechanism 735 may be configured to provide haptic-input coupling mechanism 235 for coupling any suitable portion of any suitable user input component (e.g., user input component 230) of device 200 to any suitable portion of actuator housing structure 751 (e.g., wall 251r) with a physical coupling that may be rigid or substantially rigid. For example, haptic coupling mechanism 735 may include any suitable rigid coupling material or mechanism 735m (e.g., a welded joint or glue or heat activated epoxy or female/male threaded screw components and/or any other suitable mechanism) for rigidly or substantially rigidly coupling any suitable portion 251rp of any suitable wall (e.g., wall 251r) of actuator housing 251 to any suitable portion on input component 230 (e.g., end portion 230e of input component 230 as shown in FIG. 10 when inserted in the direction I through opening 201oa) (e.g., at or adjacent fixed end 775x of spring 775s). Alternatively, haptic coupling mechanism 735 may rigidly couple a portion of input component 230 to actuator housing 251 along another actuator housing wall that may be different than the actuator housing wall at which spring 775s may be provided (e.g., wall 251b or wall 251f rather than wall 251r). For example, as shown, multi-modal haptic feedback assembly 700 may be configured to provide haptic-input coupling mechanism 245 as a haptic coupling mechanism 745 that may have different response characteristics (e.g., more stiff characteristics) than haptic-housing coupling mechanism 775. For example, haptic coupling mechanism 745 may include any suitable rigid coupling material or mechanism 745m (e.g., a welded joint or glue or heat activated epoxy or female/male threaded screw components and/or any other suitable mechanism) for rigidly or substantially rigidly coupling any suitable portion 251fp of any suitable wall (e.g., wall 251l) of actuator housing 251 to any suitable portion (not shown) of input component 230 or input component 240 or otherwise. Although not shown in FIG. 7, but as shown in FIG. 10, multi-modal haptic feedback assembly 700 may be configured to provide haptic-housing coupling mechanism 285 as a haptic coupling mechanism 785 that may have different response characteristics (e.g., more compliant characteristics) than haptic-input coupling mechanism 635 and/or haptic-input coupling mechanism 735 and/or different response characteristics (e.g., more compliant or more rigid characteristics) than haptic-housing coupling mechanism 775, where haptic-housing coupling mechanism 285 may include holder opening 785o that may be operative to receive any rigid or substantially rigid element of device housing 201 at second housing coupling location 201cl2 for physically coupling device housing 201 to actuator housing 251 via a compliant portion (e.g., spring) of coupling mechanism 785. For example, as shown in FIG. 10, a male screw thread or hook or other suitable coupling feature 201z of haptic coupling mechanism 785 may be provided by an internal surface 201i of device housing 201 (e.g., coupling feature 201z may extend between a first end that may be fixed to internal surface 201i of device housing 201 and a second free end that may be configured to be passed through holder opening 785o when haptic feedback assembly 700 may be moved in the direction of arrow D into position within internal housing space 209 of device housing 201).

Figure 8:
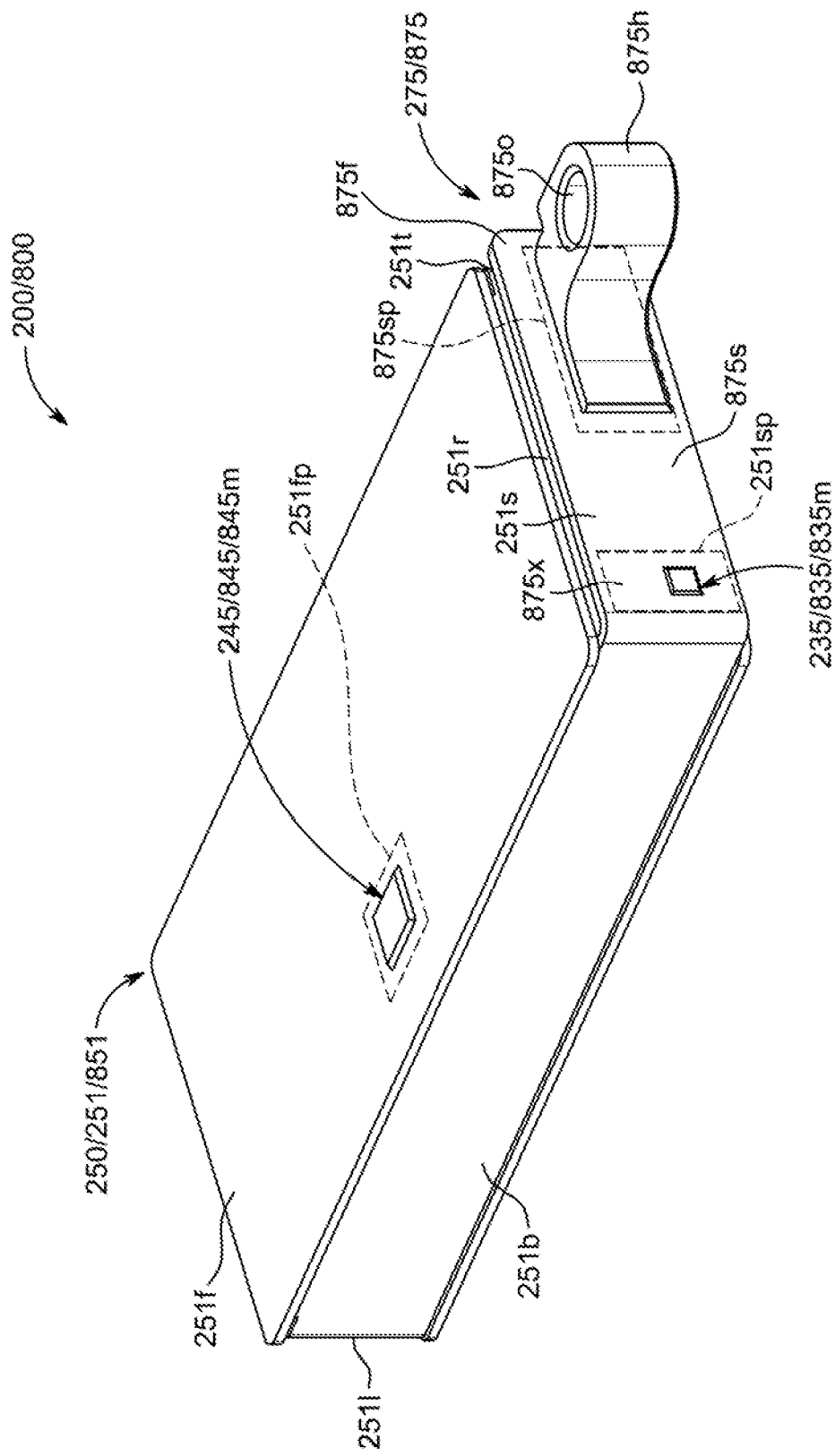
FIG. 8 is a front, right, bottom perspective view of another exemplary multi-modal haptic feedback assembly of the electronic device of FIGS. 2-4.

FIG. 8 shows an exemplary multi-modal haptic feedback assembly 800 that may provide actuator housing 251 of haptic actuator output component 250 of electronic device 200 with at least two haptic coupling mechanisms having different response characteristics. In some embodiments, as shown in FIG. 8, for example, actuator housing 251 may be any suitable three-dimensional shape that may generally be described as providing a top wall 251t, a bottom wall 251b that may be opposite top wall 251t, a left wall 251l, a right wall 251r that may be opposite left wall 251l, a front wall 251f, and a back wall 251k that may be opposite front wall 251f, and multi-modal haptic feedback assembly 800 may be configured to provide actuator housing 251 as an actuator housing structure 851, haptic-input coupling mechanism 235 as a first haptic coupling mechanism 835, and haptic-housing coupling mechanism 275 as a second haptic coupling mechanism 875 that may have different response characteristics than first haptic coupling mechanism 835. Actuator housing structure 851 may be configured to provide actuator housing 251 as a unitary structure that may include at least a portion of each actuator housing wall being integral with or rigidly coupled to or substantially rigidly coupled (e.g., welded) to one, two, three, four, or each other actuator housing wall except the actuator housing wall opposite thereto. Haptic coupling mechanism 875 may be configured to provide haptic-housing coupling mechanism 275 for physically coupling any suitable portion of device housing 201 (e.g., an internal surface 201i of device housing 201 at first housing coupling location 201cl1) of device 200 to any suitable portion of actuator housing structure 851 (e.g., wall 251f and/or wall 251k and/or wall 251b and/or wall 251r) with a physical coupling that may be less rigid (e.g., more compliant) (e.g., by any suitable amount) than the physical coupling provided by haptic coupling mechanism 835 between actuator housing structure 851 and input component 230. For example, haptic coupling mechanism 875 may include any suitable portion of any suitable actuator housing wall being configured as any suitable flexure or spring for providing compliance to the physical coupling, such as a bow spring, a cantilever spring, a leaf spring, or any other suitable flexure or spring. For example, as shown, haptic coupling mechanism 875 may provide a cantilever spring 875s with a portion of actuator housing wall 251b, where spring 875s may extend from a first fixed end 875x to a second free end 875f, where first fixed end 875x may be a portion 251s of actuator housing wall 251b that may be rigidly coupled to any other wall of haptic actuator 250 (e.g., a remainder of wall 251b extending between walls 251l and 251r, and/or wall 251f and/or wall 251k and/or wall 251r) such that movement of first fixed end 875x may be rigidly fixed to movement of a remainder of actuator housing 251 except for the movement of free end 875f of spring 875s, and where second free end 875f may be positioned free in space with respect to a remainder of actuator housing 251 when no external force is being applied to spring 875s. Therefore, wall 251b may be provided as a single unitary structure (e.g., as a single "L-shaped" or bent component). A device housing coupling feature of haptic coupling mechanism 875 for coupling to device housing 201 may be coupled to spring 875s at any portion of spring 875s proximate to free end 875f, such as a rigid holder 875h that may be rigidly coupled to portion 875sp of spring 875s adjacent free end 875f, where holder 875h may be provided with any suitable mechanism for physically coupling with device housing 201, such as a holder opening 875o that may be operative to receive any rigid or substantially rigid element (e.g., male screw thread or hook (not shown)) of internal surface 201i of device housing 201 at first housing coupling location 201cl1 for physically coupling device housing 201 to actuator housing 251 via compliant spring 875s. Alternatively, spring 875s itself may be configured to provide any suitable device housing coupling feature for coupling to device housing 201 (e.g., a portion of free end 875f may be bent or curled or otherwise shaped to provide a holder opening similar to opening 875o such that a separate component 875h may not be rigidly coupled to spring 875s). In some embodiments, a female screw thread or grommet of any suitable compliant material (e.g., a cushion or elastomeric material) similar to grommet 575c may be provided in holder opening 875o for providing additional compliance to haptic coupling mechanism 875. Haptic coupling mechanism 835 may be configured to provide haptic-input coupling mechanism 235 for coupling any suitable portion of any suitable user input component (e.g., user input component 230) of device 200 to any suitable portion of actuator housing structure 851 (e.g., wall 251b) with a physical coupling that may be rigid or substantially rigid. For example, haptic coupling mechanism 835 may include any suitable rigid coupling material or mechanism 835m (e.g., a welded joint or glue or heat activated epoxy or female/male threaded screw components and/or any other suitable mechanism) for rigidly or substantially rigidly coupling any suitable portion 251sp of any suitable wall (e.g., portion 251sp of wall portion 251s of wall 251b adjacent fixed end 875x of spring 875s) of actuator housing 251 to any suitable portion (not shown) of input component 230 (e.g., at or adjacent fixed end 875x of spring 875s). Alternatively, haptic coupling mechanism 835 may rigidly couple a portion of input component 230 to actuator housing 251 along another actuator housing wall that may be different than the actuator housing wall at which spring 875s may be provided (e.g., a portion of wall 251b other than portion 251s of wall 251b, or wall 251f or wall 215k or the like rather than portion 251s of wall 251r at end 875x). For example, as shown, multi-modal haptic feedback assembly 800 may be configured to provide haptic-input coupling mechanism 245 as a haptic coupling mechanism 845 that may have different response characteristics (e.g., more stiff characteristics) than haptic-housing coupling mechanism 875. For example, haptic coupling mechanism 845 may include any suitable rigid coupling material or mechanism 845m (e.g., a welded joint or glue or heat activated epoxy or female/male threaded screw components and/or any other suitable mechanism) for rigidly or substantially rigidly coupling any suitable portion 251fp of any suitable wall (e.g., wall 251f) of actuator housing 251 to any suitable portion (not shown) of input component 230 or input component 240 or otherwise.

Figure 9:
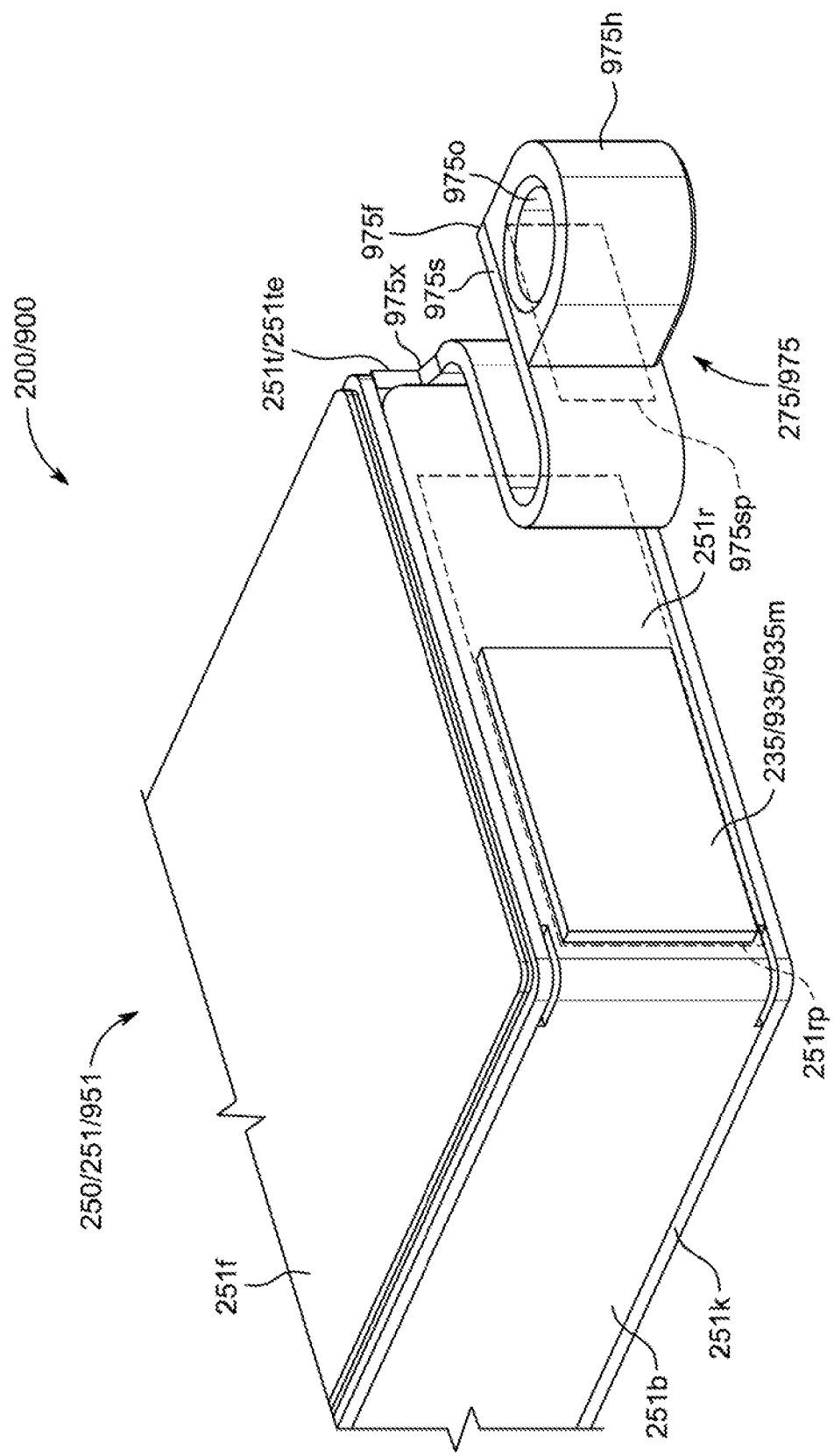
FIG. 9 is a front, right, bottom perspective view of another exemplary multi-modal haptic feedback assembly of the electronic device of FIGS. 2-4.

FIG. 9 shows an exemplary multi-modal haptic feedback assembly 900 that may provide actuator housing 251 of haptic actuator output component 250 of electronic device 200 with at least two haptic coupling mechanisms having different response characteristics. In some embodiments, as shown in FIG. 9, for example, actuator housing 251 may be any suitable three-dimensional shape that may generally be described as providing a top wall 251t, a bottom wall 251b that may be opposite top wall 251t, a left wall 251l, a right wall 251r that may be opposite left wall 251l, a front wall 251f, and a back wall 251k that may be opposite front wall 251f, and multi-modal haptic feedback assembly 900 may be configured to provide actuator housing 251 as an actuator housing structure 951, haptic-input coupling mechanism 235 as a first haptic coupling mechanism 935, and haptic-housing coupling mechanism 275 as a second haptic coupling mechanism 975 that may have different response characteristics than first haptic coupling mechanism 935. Actuator housing structure 951 may be configured to provide actuator housing 251 as a unitary structure that may include at least a portion of each actuator housing wall being integral with or rigidly coupled to or substantially rigidly coupled (e.g., welded) to one, two, three, four, or each other actuator housing wall except the actuator housing wall opposite thereto. Alternatively, as shown, two or more walls may be provided by a single unitary structure (e.g., bottom wall 251b and right wall 251r of actuator housing structure may be provided as a single "L-shaped" or bent component). Haptic coupling mechanism 975 may be configured to provide haptic-housing coupling mechanism 275 for physically coupling any suitable portion of device housing 201 (e.g., an internal surface 201i of device housing 201 at first housing coupling location 201c11) of device 200 to any suitable portion of actuator housing structure 951 (e.g., wall 251t and/or wall 251r and/or wall 251f and/or wall 251k) with a physical coupling that may be less rigid (e.g., more compliant) (e.g., by any suitable amount) than the physical coupling provided by haptic coupling mechanism 935 between actuator housing structure 951 and input component 230. For example, haptic coupling mechanism 975 may include any suitable portion of any suitable actuator housing wall being configured as any suitable flexure or spring for providing compliance to the physical coupling, such as a bow spring, a cantilever spring, a leaf spring, or any other suitable flexure or spring. For example, as shown, haptic coupling mechanism 975 may provide a cantilever spring 975s with a portion of actuator housing wall 251t, where spring 975s may extend from a first fixed end 975x to a second free end 975f, where first fixed end 975x may be a portion 251s of actuator housing wall 251t (e.g., a portion extending from an end surface 251te of wall 251t (e.g., at or near when wall 251t may be rigidly coupled to wall 251f and/or wall 251k and/or wall 251r)) such that movement of first fixed end 975x may be rigidly fixed to movement of a remainder of actuator housing 251 except for the movement of free end 975f of spring 975s, and where second free end 975f may be positioned free in space with respect to a remainder of actuator housing 251 when no external force is being applied to spring 975s. A device housing coupling feature of haptic coupling mechanism 975 for coupling to device housing 201 may be coupled to spring 975s at any portion of spring 975s proximate to free end 975f, such as a rigid holder 975h that may be rigidly coupled to portion 975sp of spring 975s adjacent free end 975f, where holder 975h may be provided with any suitable mechanism for physically coupling with device housing 201, such as a holder opening 975o that may be operative to receive any rigid or substantially rigid element (e.g., male screw thread or hook (not shown)) of internal surface 201i of device housing 201 at first housing coupling location 201c11 for physically coupling device housing 201 to actuator housing 251 via compliant spring 975s. Alternatively, spring 975s itself may be configured to provide any suitable device housing coupling feature for coupling to device housing 201 (e.g., a portion of free end 975f may be bent or curled or otherwise shaped to provide a holder opening similar to opening 975o such that a separate component 975h may not be rigidly coupled to spring 975s). In some embodiments, a female screw thread or grommet of any suitable compliant material (e.g., a cushion or elastomeric material) similar to grommet 575c may be provided in holder opening 975o for providing additional compliance to haptic coupling mechanism 975. Haptic coupling mechanism 935 may be configured to provide haptic-input coupling mechanism 235 for coupling any suitable portion of any suitable user input component (e.g., user input component 230) of device 200 to any suitable portion of actuator housing structure 951 (e.g., wall 251r) with a physical coupling that may be rigid or substantially rigid. For example, haptic coupling mechanism 935 may include any suitable rigid coupling material or mechanism 935m (e.g., a welded joint or glue or heat activated epoxy or female/male threaded screw components and/or any other suitable mechanism) for rigidly or substantially rigidly coupling any suitable portion 251rp of any suitable wall (e.g., wall 251r) of actuator housing 251 to any suitable portion (not shown) of input component 230 (e.g., proximate free end 975f of spring 975s that may be shaped to curl along and adjacent to at least a portion of wall 251r). Alternatively, haptic coupling mechanism 935 may rigidly couple a portion of input component 230 to actuator housing 251 along the same actuator housing wall 251t that may be providing spring 975s (not shown).

Figure 11:
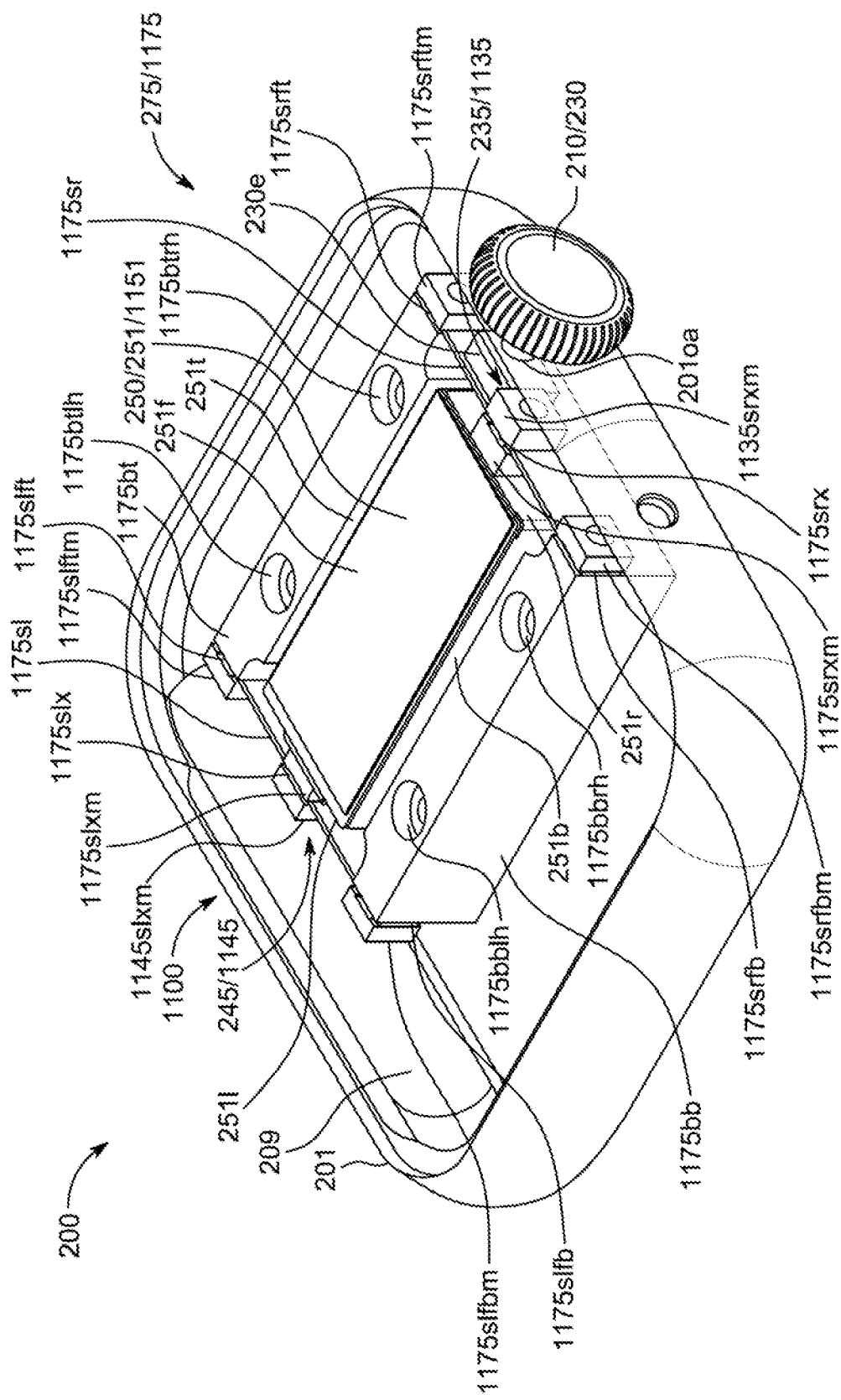
FIG. 11 is a front, right, bottom perspective view of a portion of the electronic device of FIGS. 2-4 with another exemplary multi-modal haptic feedback assembly.

FIG. 11 shows an exemplary multi-modal haptic feedback assembly 1100 that may provide actuator housing 251 of haptic actuator output component 250 of electronic device 200 with at least two haptic coupling mechanisms having different response characteristics. In some embodiments, as shown in FIG. 11, for example, actuator housing 251 may be any suitable three-dimensional shape that may generally be described as providing a top wall 251t, a bottom wall 251b that may be opposite top wall 251t, a left wall 251l, a right wall 251r that may be opposite left wall 251l, a front wall 251f, and a back wall (not shown) that may be opposite front wall 251f, and multi-modal haptic feedback assembly 1100 may be configured to provide actuator housing 251 as an actuator housing structure 1151, haptic-input coupling mechanism 235 as a first haptic coupling mechanism 1135, and haptic-housing coupling mechanism 275 as a second haptic coupling mechanism 1175 that may have different response characteristics than first haptic coupling mechanism 1135. Actuator housing structure 1151 may be configured to provide actuator housing 251 as a unitary structure that may include at least a portion of each actuator housing wall being integral with or rigidly coupled to or substantially rigidly coupled (e.g., welded) to one, two, three, four, or each other actuator housing wall except the actuator housing wall opposite thereto. Alternatively, as shown, two or more walls may be provided by a single unitary structure (e.g., bottom wall 251b and right wall 251r of actuator housing structure may be provided as a single "L-shaped" or bent component, and top wall 251t and left wall 251l of actuator housing structure may be provided as a single "L-shaped" or bent component). Haptic coupling mechanism 1175 may be configured to provide haptic-housing coupling mechanism 275 for physically coupling any suitable portion of device housing 201 (e.g., an internal surface 201i of device housing 201 at least at first housing coupling location 201c/1) of device 200 to any suitable portion of actuator housing structure 1151 with a physical coupling that may be less rigid (e.g., more compliant) (e.g., by any suitable amount) than the physical coupling provided by haptic coupling mechanism 1135 between actuator housing structure 1151 and input component 230. For example, haptic coupling mechanism 1175 may include at least one suitable flexure or spring for providing compliance to the physical coupling, such as a bow spring, a cantilever spring, a leaf spring, or any other suitable flexure or spring. For example, as shown, haptic coupling mechanism 1175 may provide a first flexure leafy spring 1175*sr*, where spring 1175*sr* may extend from a first end 1175*srft* to a second end 1175*srfb* via any suitable intermediate portion 1175*srx*, where intermediate portion 1175*srx* may be rigidly or substantially rigidly coupled to any suitable portion of actuator housing 251 (e.g., to any suitable portion of wall 251*r*) via any suitable rigid coupling material or mechanism 1175*srxm* (e.g., a welded joint or glue or heat activated epoxy or female/male threaded screw components and/or any other suitable mechanism) for rigidly or substantially rigidly coupling any suitable portion of intermediate portion 1175*srx* of spring 1175*sr* to any suitable portion of any suitable wall (e.g., wall 251*r*) of actuator housing 251, where first end 1175*srft* may be rigidly or substantially rigidly coupled to any suitable portion of device housing 201 (e.g., to any suitable portion 201*cl*1) via any suitable rigid coupling material or mechanism 1175*srftm* (e.g., a welded joint or glue or heat activated epoxy or female/male threaded screw components and/or any other suitable mechanism) and/or via any suitable rigid coupling material or mechanism 1175*bt* (e.g., a rigid body that may include a welded joint or glue or heat activated epoxy or female/male threaded screw components and/or any other suitable mechanism to rigidly couple to first end 1175*srft* and that may include one or more threaded screw holes (e.g., hole 1175*btrh* and/or hole 1175*btlh*) or any other suitable mechanism that may be used for rigidly coupling mechanism 1175*bt* to device housing 201), and where second end 1175*srfb* may be rigidly or substantially rigidly coupled to any suitable portion of device housing 201 (e.g., to any suitable portion 201*cl*1) via any suitable rigid coupling material or mechanism 1175*srfbm* (e.g., a welded joint or glue or heat activated epoxy or female/male threaded screw components and/or any other suitable mechanism) and/or via any suitable rigid coupling material or mechanism 1175*bb* (e.g., a rigid body that may include a welded joint or glue or heat activated epoxy or female/male threaded screw components and/or any other suitable mechanism to rigidly couple to second end 1175*srfb* and that may include one or more threaded screw holes (e.g., hole 1175*bbrh* and/or hole 1175*bblh*) or any other suitable mechanism that may be used for rigidly coupling mechanism 1175*bb* to device housing 201). Additionally or alternatively, for example, as shown, haptic coupling mechanism 1175 may provide a second flexure leafy spring 1175*sl*, where spring 1175*sl* may extend from a first end 1175*slft* to a second end 1175*slfb* via any suitable intermediate portion 1175*slx*, where intermediate portion 1175*slx* may be rigidly or substantially rigidly coupled to any suitable portion of actuator housing 251 (e.g., to any suitable portion of wall 251*l*) via any suitable rigid coupling material or mechanism 1175*slxm* (e.g., a welded joint or glue or heat activated epoxy or female/male threaded screw components and/or any other suitable mechanism) for rigidly or substantially rigidly coupling any suitable portion of intermediate portion 1175*slx* of spring 1175*sl* to any suitable portion of any suitable wall (e.g., wall 251*l*) of actuator housing 251, where first end 1175*slft* may be rigidly or substantially rigidly coupled to any suitable portion of device housing 201 (e.g., to any suitable portion 201*cl*1) via any suitable rigid coupling material or mechanism 1175*slftm* (e.g., a welded joint or glue or heat activated epoxy or female/male threaded screw components and/or any other suitable mechanism) and/or via any suitable rigid coupling material or mechanism 1175*bt* (e.g., a rigid body that may include a welded joint or glue or heat activated epoxy or female/male threaded screw components and/or any other suitable mechanism to rigidly couple to first end 1175*slft* and that may include one or more threaded screw holes (e.g., hole 1175*btrh* and/or hole 1175*btlh*) or any other suitable mechanism that may be used for rigidly coupling mechanism 1175*bt* to device housing 201), and where second end 1175*slfb* may be rigidly or substantially rigidly coupled to any suitable portion of device housing 201 (e.g., to any suitable portion 201*cl*1) via any suitable rigid coupling material or mechanism 1175*slfbm* (e.g., a welded joint or glue or heat activated epoxy or female/male threaded screw components and/or any other suitable mechanism) and/or via any suitable rigid coupling material or mechanism 1175*bb* (e.g., a rigid body that may include a welded joint or glue or heat activated epoxy or female/male threaded screw components and/or any other suitable mechanism to rigidly couple to second end 1175*slfb* and that may include one or more threaded screw holes (e.g., hole 1175*bbrh* and/or hole 1175*bblh*) or any other suitable mechanism that may be used for rigidly coupling mechanism 1175*bb* to device housing 201). Haptic coupling mechanism 1135 may include any suitable rigid coupling material or mechanism 1135*srxm* (e.g., a welded joint or glue or heat activated epoxy or female/male threaded screw components and/or any other suitable mechanism) for rigidly or substantially rigidly coupling any suitable portion of any suitable wall (e.g., wall 251*r*) of actuator housing 251 to any suitable portion (e.g., end 230*e*) of user input component 230 (e.g., via intermediate portion 1175*srx* of spring 1175*sr* and/or via rigid coupling mechanism 1175*srxm* (as shown)). Additionally or alternatively, as shown, multi-modal haptic feedback assembly 1100 may be configured to provide haptic-input coupling mechanism 245 as another haptic coupling mechanism 1145 that may have different response characteristics than haptic coupling mechanism 1135, where haptic coupling mechanism 1145 may include any suitable rigid coupling material or mechanism 1145*slxm* (e.g., a welded joint or glue or heat activated epoxy or female/male threaded screw components and/or any other suitable mechanism) for rigidly or substantially rigidly coupling any suitable portion of any suitable wall (e.g., wall 251*l*) of actuator housing 251 to any suitable portion of user input component 240 (not shown in FIG. 11) (e.g., via intermediate portion 1175*slx* of spring 1175*sl* and/or via rigid coupling mechanism 1175*slxm* (as shown)). Therefore, while a portion of input component 230 may be rigidly or substantially rigidly physically coupled to actuator housing 251 by haptic coupling mechanism 1135 (e.g., via rigid coupling mechanism 1135*srxm* and via intermediate portion 1175*srx* of spring 1175*sr* (e.g., a rigid material) and via rigid coupling mechanism 1175*srxm* (as shown)), device housing 201 may be physically coupled in a less rigid manner to actuator housing 251 by haptic coupling mechanism 1175 (e.g., via one or more of free ends 1175*srfb* and 1175*srft* of spring 1175*sr* and/or via one or more of free ends 1175*slfb* and 1175*slft* of spring 1175*sl*), as any free end of any sprig of haptic coupling mechanism 1175 (e.g., free with respect to actuator housing 251) may be configured to provide a physical coupling to actuator housing 251 with response characteristics that are different (e.g., less rigid (e.g., more compliant)) by any suitable amount than the response characteristics of the physical coupling to actuator housing 251 of rigid or substantially rigid haptic coupling mechanism 1135 due to the configuration of the spring(s).

Therefore, any haptic-housing coupling mechanism (e.g., any suitable spring and/or compliant grommet and/or compliant adhesive cushion and/or the like) may be configured or operative to act like a rigid or substantially rigid physical coupling or any other suitable coupling that may enable the haptic-housing coupling mechanism to at least substantially closely tie the movement of its coupled housing to the movement of its coupled actuator for an actuator waveform (AWF) with a parameter (e.g., a frequency parameter) up to a certain magnitude of first threshold but also to exhibit more compliance for dampening or absorbing the effects of the AWF (e.g., frequency of the AWF producing the device waveform of the haptic-housing coupling mechanism) as the AWF's parameter becomes stronger than some second threshold that may be greater than or equal to the first threshold (e.g., as a frequency parameter of the AWF increases beyond a particular cut-off threshold) for enabling the haptic-housing coupling mechanism to allow the movement of its coupled housing to not be closely tied to the movement of its coupled actuator, while any haptic-input coupling mechanism may be operative to act like a rigid or substantially rigid physical coupling even when the parameter of the AWF becomes stronger than the second threshold (e.g., as may be shown in FIG. 12). An actuator housing of a single haptic actuator housing may be soft mounted to a device housing of an electronic device (e.g., with a mount resonance above the resonance frequency f0 of the haptic actuator) and hard mounted to a user input component of the device not physically coupled to the device housing, such that the device waveform of the device housing produced by the actuator waveform of the actuator housing and the device waveform of the input component produced by the actuator waveform of the actuator housing may be separated through frequency separation (e.g., at least at certain frequencies of the actuator waveform). This may enable multi-modal haptic feedback to be produced by an electronic device with a single haptic actuator that may be outputting only a single actuator waveform at any moment in time (e.g., rather than utilizing two distinct haptic actuators for generating two distinct actuator waveforms at a moment in time). Only one or more simple additional mechanisms (e.g., one or more compliant mechanisms (e.g., any suitable spring and/or compliant grommet and/or compliant adhesive cushion and/or the like)) may be utilized for enabling an electronic device with a single haptic actuator to provide multi-modal haptic feedback for different portions of the device (e.g., the device housing and a user input component), thereby providing a low cost solution and/or a low power solution and/or a limited real-estate resource solution for enabling such multi-modal haptic feedback on a particular electronic device. The net haptic effect and/or decoupling may be enabled by a haptic-housing coupling mechanism, a haptic-input coupling mechanism, and a transition between two different actuator waveforms (e.g., a transition from an actuator waveform with a first frequency parameter below a threshold (e.g., a threshold that may be dependent on characteristics of the coupling mechanisms) to an actuator waveform with a second frequency parameter greater than the threshold (e.g., using any suitable haptic synthesizer application (e.g., application 103 or application 203) that may be configured to be used by a synthesizer engine or any suitable module to generate and/or provide instructions or voltage waveforms (input waveforms) for generating specific actuator waveforms for dictating a specific mode of the multi-modal haptic feedback)). In some embodiments, there may be three or more modes of the multi-modal haptic feedback enabled by the electronic device. For example, there may be a compliant haptic-housing coupling mechanism for coupling the actuator housing to the device housing, a first haptic-input coupling mechanism for coupling a first input component to the actuator housing, and a second haptic-input coupling mechanism for coupling a second input component to the actuator housing. In some embodiments, such a second haptic-input coupling mechanism may be less compliant or otherwise differently responsive than the haptic-housing coupling mechanism but more compliant or otherwise differently responsive than the first haptic-input coupling mechanism, such that a first threshold or parameter range may be defined (e.g., based on characteristics of the haptic actuator) for an AWF that may provide a first haptic alert (e.g., similar detectable DWFs at the device housing and each input component), a second threshold or parameter range may be defined (e.g., based on the response or compliance of the haptic-housing coupling mechanism) for an AWF that may provide a second haptic alert (e.g., similar detectable DWFs at each input component and a mild or unnoticeable DWF at the device housing), and a third threshold or parameter range may be defined (e.g., based on the response or compliance of the second input component) for an AWF that may provide a third haptic alert (e.g., a detectable DWF at the first input component and a mild or unnoticeable DWF at the device housing and a mild or unnoticeable DWF at the second input component).

Figure 13:
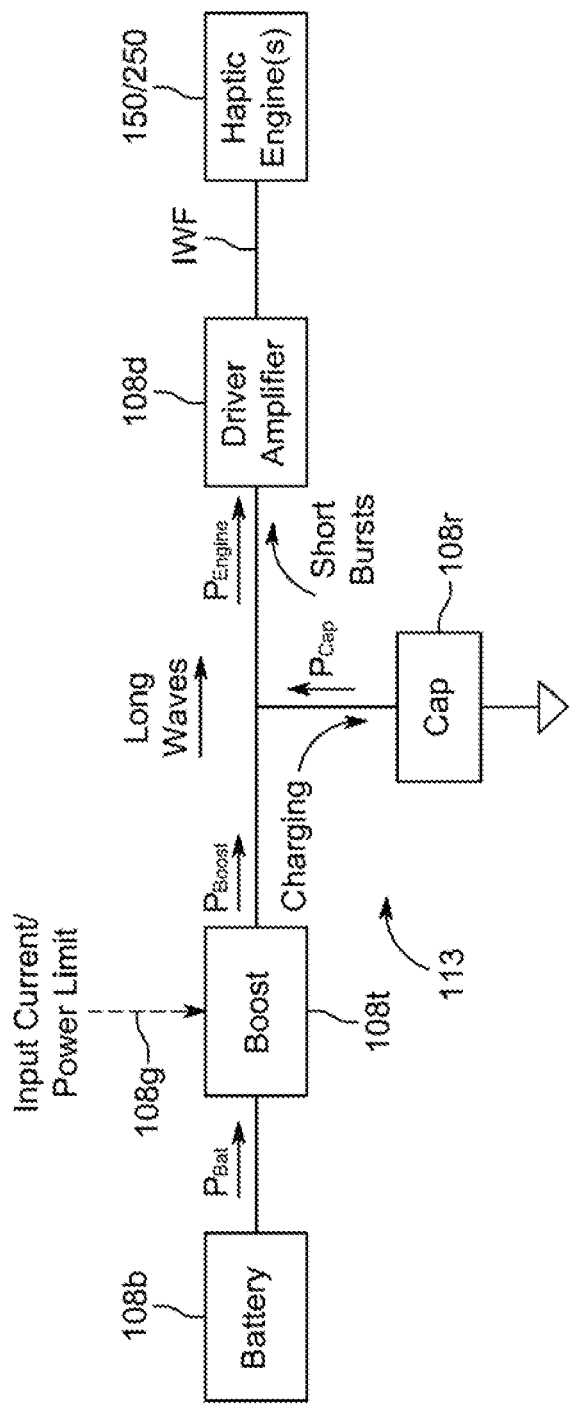
FIG. 13 is a schematic view of an illustrative subsystem of an electronic device to support higher peak power for shorter bursts of haptic feedback.

As shown in FIG. 13, any or each electronic device may be provided with a subsystem 113 that may be operative to support higher peak power for certain types of an actuator input waveform IWF while avoiding brown outs. For example, such higher peak power may be utilized to provide short bursts by an actuator input waveform IWF with a higher peak power that may be used for providing a second haptic alert of a second mode with a higher peak force in which a specific portion of the device (e.g., the user input component of the device) may be perceived by the device user to be providing a localized haptic feedback (e.g., a short click/detent asset) that is distinguishable from (e.g., greater than) any haptic feedback being provided by another portion of the device (e.g., a majority of the device's housing), which may be carried out in response to detecting a user interacting with a user input component in a particular manner. As shown, for example, any suitable battery 108b of power supply 108 may be operative to provide power $P_{Bat}$ (e.g., via any suitable bus 114) to a boost component 108t (e.g., a voltage regulator), which may also receive any suitable input current or power limit control signal 108g (e.g., from any suitable processor) and may be used to recharge an energy storage component 108r (e.g., a capacitor (e.g., 1 mF or higher)) over a drawn out period of time without exceeding a power limit of battery 108b, such as with at least a portion of a $P_{Boost}$ while another portion of $P_{Boost}$ may be used to provide long waves via at least a portion of $P_{Engine}$ to a driver amplifier 108d (e.g., a class-D amplifier) that may be used by driver amplifier 108d to drive haptic actuator output component 250 with IWF with long waves. When needed, and without discharging to a voltage that would be too low, energy storage component 108r may be used to supply a short burst of current via $P_{Cap}$ to provide at least a portion of $P_{Engine}$ to driver amplifier 108d that may be used by driver amplifier 108d to drive haptic actuator output component 250 with IWF with short bursts (e.g., 4 Watts for 10 milliseconds). This scheme may enable a higher peak power for short waveforms and can enable a higher peak force for a localized haptic mode of a multi-mode haptic feedback feature of the electronic device.

Figure 14:
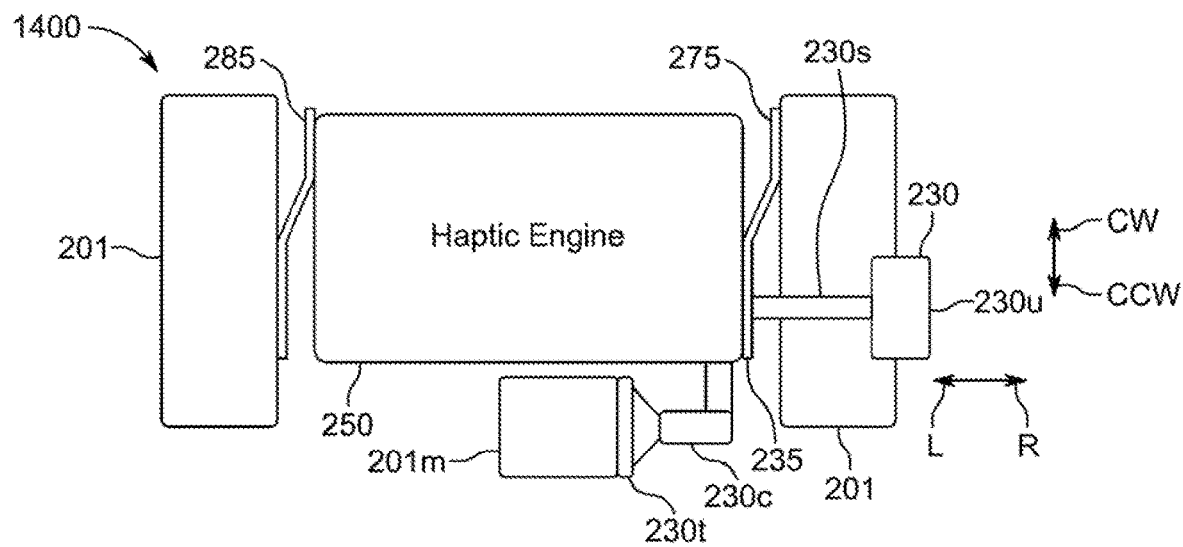
FIGS. 14-16 are front views of a portion of various electronic devices with a multi-modal haptic feedback assembly and at least one additional input component sensor.
Figure 15:
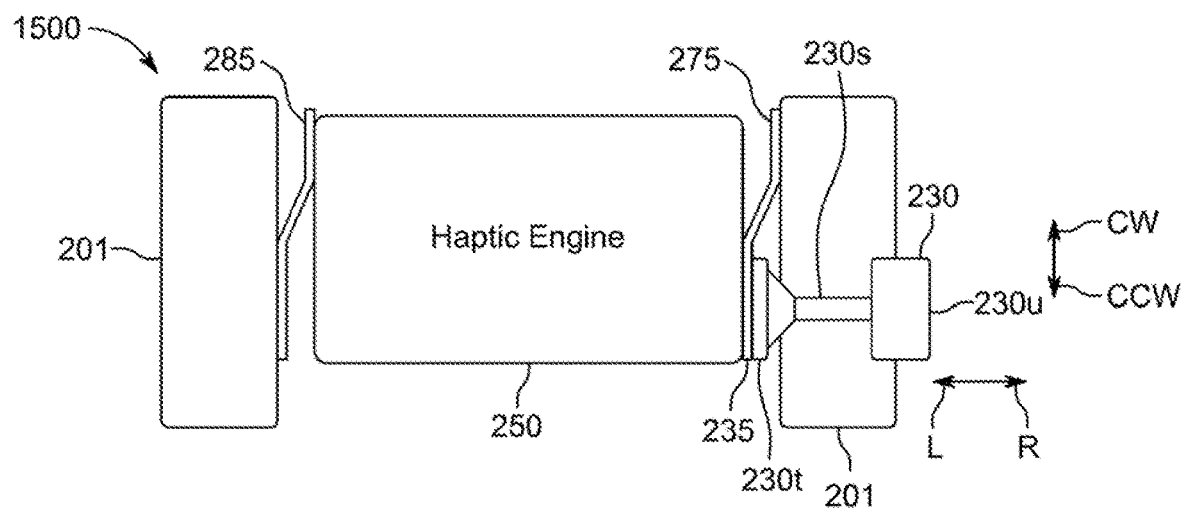
Figure 16:
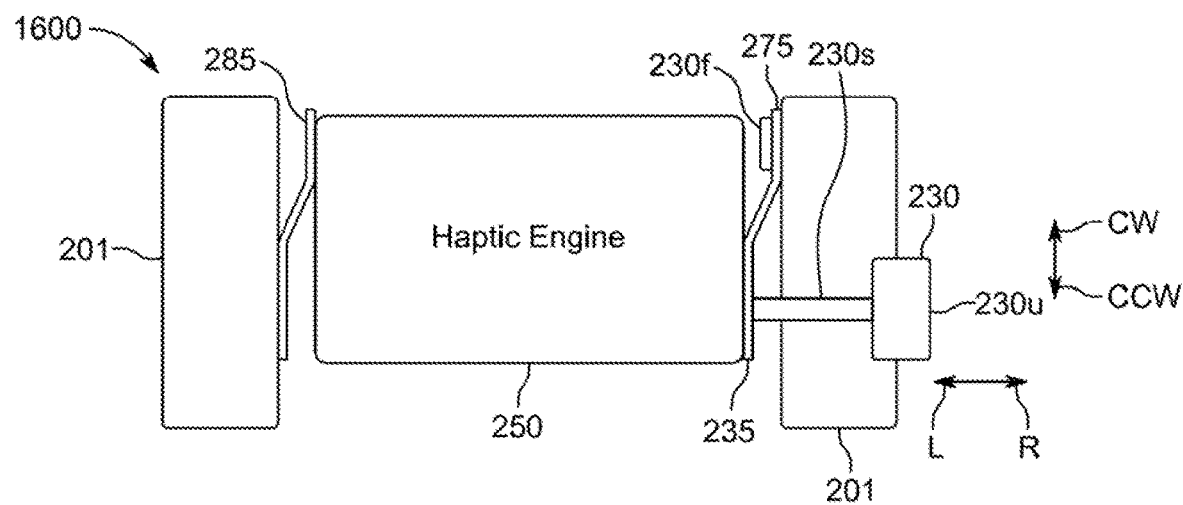

An electronic device may be configured to detect different types of user interactions with an input component in different manners and provide different haptic responses to such detections. For example, as shown in FIG. 14, an electronic device 1400 may include first haptic-input coupling mechanism 235 that may physically couple haptic actuator output component 250 to first input component 230, first haptic-housing coupling mechanism 275 that may physically couple haptic actuator output component 250 to first housing coupling location 201c/1 of housing 201, and second haptic-housing coupling mechanism 285 that may physically couple haptic actuator output component 250 to second housing coupling location 201c/2 of housing 201, where input component 230 may include a user interface region 230u exposed external to housing 201 and a stem region 230s extending between user interface region 230u and haptic-input coupling mechanism 235, while any suitable tactile click switch 230t may be coupled to haptic actuator output component 250 (e.g., to stator housing 251) and may be operative to be pushed in the direction of arrow L by haptic actuator output component 250 against any suitable housing or other internal component 201m in order for tactile click switch 230t to provide click tactile feedback that may be felt by a user interfacing with user interface region 230u when such a user pushes input component 230 in the linear direction of arrow L. This may provide a more silent tactile switch than an electronic device 1500 of FIG. 15 that may include first haptic-input coupling mechanism 235 that may physically couple haptic actuator output component 250 to first input component 230, first haptic-housing coupling mechanism 275 that may physically couple haptic actuator output component 250 to first housing coupling location 201c/1 of housing 201, and second haptic-housing coupling mechanism 285 that may physically couple haptic actuator output component 250 to second housing coupling location 201c/2 of housing 201, where input component 230 may include user interface region 230u exposed external to housing 201 and stem region 230s extending between user interface region 230u and tactile click switch 230t, which may be provided between input component 230 and haptic-input coupling mechanism 235, while tactile click switch 230t may be operative to be pushed in the direction of arrow L by input component 230 against haptic-input coupling mechanism 235 in order for tactile click switch 230t to provide click tactile feedback that may be felt by a user interfacing with user interface region 230u when such a user pushes input component 230 in the linear direction of arrow L. An alternative user interaction with input component 230 other than depressing input component 230 in the linear direction of arrow L may be rotation of input component 230 about a linear axis in either the direction of arrow CW or arrow CCW, and any suitable sensor(s) may be provided to detect such rotation and initiate a localized haptic feedback mode of a multi-modal haptic feedback assembly at input component 230. Therefore, device 1400 may provide both a silent tactile switch plus bi-modal click tactile feedback for different types of user interaction with input component 230, and device 1500 may provide both a tactile switch plus bi-modal click tactile feedback for different types of user interaction with input component 230. As shown in FIG. 16, an electronic device 1600 may include first haptic-input coupling mechanism 235 that may physically couple haptic actuator output component 250 to first input component 230, first haptic-housing coupling mechanism 275 that may physically couple haptic actuator output component 250 to first housing coupling location 201c/1 of housing 201, and second haptic-housing coupling mechanism 285 that may physically couple haptic actuator output component 250 to second housing coupling location 201c/2 of housing 201, where input component 230 may include user interface region 230u exposed external to housing 201 and stem region 230s extending between user interface region 230u and haptic-input coupling mechanism 235, while any suitable force sensor 230f (e.g., a strain gauge or a capacitive displacement sensor or a cap gap sensor or the like) may be positioned anywhere that may be operative to detect any suitable force exerted on input component 230 by a user or any suitable movement of input component 230 and/or the multi-modal feedback assembly and device 1600 may be configured such that any suitable press force (e.g., in the direction of arrow L) on user interface 230u by a user may be detected for initiating a localized haptic feedback mode of a multi-modal haptic feedback assembly at input component 230.

Certain processes described herein (e.g., any waveform control applications and/or algorithms), as well as any other aspects of the disclosure, may each be implemented by software, but may also be implemented in hardware, firmware, or any combination of software, hardware, and firmware. They each may also be embodied as computer-readable code recorded on a computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Many alterations and modifications of the preferred embodiments will no doubt become apparent to a person of ordinary skill in the art after having read the foregoing description, it is to be understood that the particular embodiments shown and described by way of illustration are in no way intended to be considered limiting. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms, such as "up" and "down," "front" and "back," "left" and "right," "upper" and "lower," "top" and "bottom" and "side," "vertical" and "horizontal" and "diagonal," "length" and "width" and "thickness" and "diameter" and "cross-section" and "longitudinal," "X-" and "Y-" and "Z-," and/or the like, may be used herein only for convenience, and that no fixed or absolute directional or orientational limitations are intended by the use of these words. If reoriented, different directional or orientational terms may need to be used in their description, but that will not alter their fundamental nature as within the scope and spirit of the subject matter described herein in any way. Thus, references to the details of the described embodiments are not intended to limit their scope.

What is claimed is:

1. An electronic device comprising:
   a device housing defining an interior space;

a haptic actuator positioned within the interior space;
an input component positioned at least partially within the interior space and accessible by a user via an opening extending through the device housing;
a haptic-housing coupling mechanism physically coupling the haptic actuator to the device housing; and
a haptic-input coupling mechanism physically coupling the haptic actuator to the input component, wherein a compliance of the haptic-input coupling mechanism is less than a compliance of the haptic-housing coupling mechanism;
wherein:
in response to the haptic actuator producing an actuator waveform:
the haptic-housing coupling mechanism produces a first device waveform at the device housing;
the haptic-input coupling mechanism produces a second device waveform at the input component; and
a motion of the device housing created by the first device waveform is greater than a motion of the input component created by the second device waveform.

2. The electronic device of claim 1, wherein the haptic-housing coupling mechanism comprises a spring physically coupling the haptic actuator to the device housing.

3. The electronic device of claim 1, wherein the haptic-input coupling mechanism comprises a welded joint directly physically coupling the haptic actuator to the input component.

4. The electronic device of claim 1, further comprising a strap coupled to the device housing, wherein the strap is operative to hold the device housing against a wrist of the user.

5. The electronic device of claim 4, wherein the input component is a digital crown.

6. The electronic device of claim 4, wherein the input component is a push button.

7. The electronic device of claim 1, wherein the input component is movable with respect to the device housing via the opening.

8. The electronic device of claim 1, wherein:
when the haptic actuator provides a first actuator waveform, the haptic-housing coupling mechanism is operative to produce a first device housing waveform at the device housing;
when the haptic actuator provides the first actuator waveform, the haptic-input coupling mechanism is operative to produce a first device input waveform at the input component;
when the haptic actuator provides a second actuator waveform, the haptic-housing coupling mechanism is operative to produce a second device housing waveform at the device housing;
when the haptic actuator provides the second actuator waveform, the haptic-input coupling mechanism is operative to produce a second device input waveform at the input component;
a frequency parameter of the first actuator waveform is below a threshold;
a frequency parameter of the second actuator waveform is above the threshold;
a movement parameter of the first device input waveform is no greater than two times a movement parameter of the first device housing waveform; and
a movement parameter of the second device input waveform is no less than five times a movement parameter of the second device housing waveform.

9. The electronic device of claim 8, wherein the frequency parameter of the first actuator waveform is at least two times less than the frequency parameter of the second actuator waveform.

10. An electronic device comprising:
a device housing defining an interior space;
a haptic actuator positioned within the interior space;
an input component;
a haptic-housing coupling mechanism mounting the haptic actuator to the device housing and comprising a first portion coupled to the haptic actuator and a second portion coupled to the device housing; and
a haptic-input coupling mechanism physically coupling the haptic actuator to the input component while enabling the input component to move freely in at least one direction with respect to the device housing, wherein:
the haptic-input coupling mechanism comprises a welded joint physically coupling the haptic actuator to the input component; and
the haptic-housing coupling mechanism is distinct from the haptic actuator; and in response to the haptic actuator producing an actuator waveform:
the haptic-housing coupling mechanism produces a first device waveform at the device housing;
the haptic-input coupling mechanism produces a second device waveform at the input component; and
a motion of the device housing created by the first device waveform is greater than a motion of the input component created by the second device waveform.

11. The electronic device of claim 10, wherein the haptic actuator is configured to move within the interior space in the at least one direction with respect to the device housing when the haptic actuator is driven by an actuator input waveform.

12. The electronic device of claim 10, wherein:
the haptic actuator comprises a first fundamental resonance frequency; and
the haptic-housing coupling mechanism comprises a second fundamental resonance frequency that is greater than the first fundamental resonance frequency.

13. The electronic device of claim 10, wherein the haptic-housing coupling mechanism comprises a spring physically coupling the haptic actuator to the device housing.

14. An electronic device comprising:
a device housing defining an interior space;
a haptic actuator positioned within the interior space;
a haptic-housing coupling mechanism physically coupling the haptic actuator to the device housing, wherein:
the haptic actuator comprises a first fundamental resonance frequency; and
the haptic-housing coupling mechanism comprises a second fundamental resonance frequency that is greater than the first fundamental resonance frequency;
an input component; and
a haptic-input coupling mechanism physically coupling the haptic actuator to the input component while enabling the input component to move freely in at least one direction with respect to the device housing, wherein:
when a frequency parameter of an actuator input waveform applied to the haptic actuator is the first fundamental resonance frequency, the haptic actuator drives movement of the device housing; and
when the frequency parameter of the actuator input waveform applied to the haptic actuator is greater than the second fundamental resonance frequency, the haptic actuator simultaneously drives movement of the input component and movement of the device housing that is less than the movement of the input component.

15. An electronic device comprising:
a device housing defining an interior space;
a haptic actuator positioned within the interior space;
a haptic-housing coupling mechanism physically coupling the haptic actuator to the device housing, wherein:
the haptic actuator comprises a first fundamental resonance frequency; and
the haptic-housing coupling mechanism comprises a second fundamental resonance frequency that is greater than the first fundamental resonance frequency;
an input component; and
a haptic-input coupling mechanism physically coupling the haptic actuator to the input component while enabling the input component to move freely in at least one direction with respect to the device housing, wherein:
when the haptic actuator provides a first actuator waveform, the haptic-housing coupling mechanism is operative to produce a first device housing waveform at the device housing;
when the haptic actuator provides the first actuator waveform, the haptic-input coupling mechanism is operative to produce a first device input waveform at the input component;
when the haptic actuator provides a second actuator waveform, the haptic-housing coupling mechanism is operative to produce a second device housing waveform at the device housing;
when the haptic actuator provides the second actuator waveform, the haptic-input coupling mechanism is operative to produce a second device input waveform at the input component;
a frequency parameter of the first actuator waveform is below the second fundamental resonance frequency;
a frequency parameter of the second actuator waveform is above the second fundamental resonance frequency;
a movement parameter of the first device input waveform is within a threshold magnitude of a movement parameter of the first device housing waveform; and
a movement parameter of the second device input waveform is greater than a movement parameter of the second device housing waveform by at least the threshold magnitude.

16. A haptic feedback assembly for an electronic device comprising a first component and a second component, the haptic feedback assembly comprising:
a haptic actuator;
a first coupling mechanism physically coupling the haptic actuator to the first component; and
a second coupling mechanism operative to physically couple the haptic actuator to the second component, wherein a compliance of the second coupling mechanism is less than a compliance of the first coupling mechanism;
wherein:
in response to the haptic actuator producing an actuator waveform;
the first coupling mechanism produces a first device waveform at the first component;
the second coupling mechanism produces a second device waveform at the second component; and
a motion of the first component created by the first device waveform is greater than a motion of the second component created by the second device waveform.

* * * * *